US012722390B2

(12) United States Patent
Nakagawa

(10) Patent No.: US 12,722,390 B2
(45) Date of Patent: Sep. 1, 2026

(54) LIQUID EJECTION HEAD AND LIQUID EJECTION APPARATUS

(71) Applicant: CANON KABUSHIKI KAISHA, Tokyo (JP)

(72) Inventor: Yoshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 18/741,619

(22) Filed: Jun. 12, 2024

(65) Prior Publication Data

US 2024/0416663 A1 Dec. 19, 2024

(30) Foreign Application Priority Data

Jun. 14, 2023 (JP) ................................ 2023-097646

(51) Int. Cl.

*B41J 2/18* (2006.01)
*B41J 2/14* (2006.01)
*B41J 2/175* (2006.01)
*B41J 2/19* (2006.01)

(52) U.S. Cl.

CPC .............. *B41J 2/18* (2013.01); *B41J 2/1404* (2013.01); *B41J 2/14145* (2013.01); *B41J 2/17596* (2013.01); *B41J 2/19* (2013.01); *B41J 2202/12* (2013.01)

(58) Field of Classification Search

CPC ........ B41J 2/18; B41J 2/1404; B41J 2/14145; B41J 2/17596; B41J 2/19; B41J 2202/12

See application file for complete search history.

(56) References Cited

U.S. PATENT DOCUMENTS

| | | | | |
|---|---|---|---|---|
| 9,616,673 | B2 * | 4/2017 | Domae | ...................... B41J 2/18 |
| 11,420,463 | B2 * | 8/2022 | Okuda | ................ B41J 2/14233 |
| 2019/0009544 | A1 | 1/2019 | Nakagawa | |
| 2023/0120077 | A1 | 4/2023 | Miyashita | |

FOREIGN PATENT DOCUMENTS

| | | | |
|---|---|---|---|
| AU | 2016277746 | A1 | 7/2017 |
| EP | 3189971 | A2 | 7/2017 |
| JP | 2014195932 | A | 10/2014 |
| JP | 2019059046 | A | 4/2019 |
| JP | 2020059166 | A | 4/2020 |

* cited by examiner

*Primary Examiner* — Geoffrey S Mruk

(74) *Attorney, Agent, or Firm* — Canon U.S.A., Inc. IP Division

(57) ABSTRACT

A liquid ejection head including: an ejection port portion with an ejection port configured to eject liquid in an ejection direction; a pressure chamber that includes therein an energy-generating element to eject the liquid from the ejection port; a supply channel configured to supply the liquid to the pressure chamber; a collecting channel configured to collect the liquid from the pressure chamber; and a pump configured to cause the liquid in the collecting channel to flow into the supply channel, wherein $F_{ratio}$ is 1.4 or less.

15 Claims, 25 Drawing Sheets

120, 150
121, 151
122, 152
123
125, 155
190, 190A, 190B
190a
191, 191A, 191B
200
210
220
230
P1
P2
P3
F3
S1
S2
S3
H

LIQUID EJECTION HEAD AND LIQUID EJECTION APPARATUS

BACKGROUND OF THE INVENTION

Field of the Invention

The present disclosure relates to a liquid ejection head and a liquid ejection apparatus with the liquid ejection head.

Description of the Related Art

A circulation type liquid ejection apparatus is known in which liquid is circulated between a liquid ejection head (hereinafter also referred to simply as the "head") and a liquid storage portion (hereinafter also referred to simply as the "tank") to discharge air bubbles in a channel and reduce the thickening of ink near an ejection port. In some circulation type liquid ejection apparatuses, a liquid is circulated between a liquid ejection head and a main body using a pump outside the head (a pump provided in the main body or the like), or a liquid is circulated in a liquid ejection head using a pump provided in the liquid ejection head (a pump inside the head).

There is a liquid ejection apparatus that circulates ink in a liquid ejection head by mounting a piezoelectric circulating pump (hereinafter also referred to simply as the "piezoelectric pump") as a pump inside the head (Japanese Patent Laid-Open Publication No. 2014-195932, Japanese Patent Laid-Open Publication No. 2019-059046, and the like). In Japanese Patent Laid-Open Publication No. 2014-195932, the ink supplied from the circulating pump to a pressure control mechanism is supplied to a pressure chamber through an ink supply channel, and the ink that is not ejected is collected to the circulating pump through an ink collecting channel. A liquid circulator in Japanese Patent Laid-Open Publication No. 2019-059046 has an upstream channel and a downstream channel as circulation paths that connect a tank for storing the liquid to be supplied to a head with the liquid ejection head, a bypass for connecting the upstream channel and the downstream channel without passing through the head, and a pressure detecting section for detecting the pressure of the bypass.

SUMMARY OF THE INVENTION

The present disclosure to solve the above problems provides a liquid ejection head including: an ejection port portion with an ejection port configured to eject liquid in an ejection direction at a first end portion; a pressure chamber that includes therein an energy-generating element configured to generate energy required to eject the liquid from the ejection port and communicates with the ejection port portion at a second end portion opposite the first end portion; a supply channel configured to supply the liquid to the pressure chamber; a collecting channel configured to collect the liquid from the pressure chamber; and a pump configured to cause the liquid in the collecting channel to flow into the supply channel, wherein $F_{ratio}$ represented by the following formula is 1.4 or less:

$$F_{ratio} = 1.619 \times \left(H^{-0.34} P^{-0.66} W\right)^{-0.1569} \times \log(U_x / U_v)^{-0.2560}$$

wherein W [μm] denotes a length of the ejection port in a flow direction of the liquid in the pressure chamber, P [μm]

denotes a length of the ejection port portion in an ejection direction of the liquid from the ejection port, H [μm] denotes a height of the pressure chamber on an upstream side in the flow direction of the liquid in the pressure chamber, $U_v$ [m/s] denotes an evaporation speed in the ejection port, and $U_x$ [m/s] denotes a flow velocity of the liquid flowing through the pressure chamber.

Further features of the present invention will become apparent from the following description of exemplary embodiments with reference to the attached drawings.

DESCRIPTION OF THE EMBODIMENTS

Figure 1A:
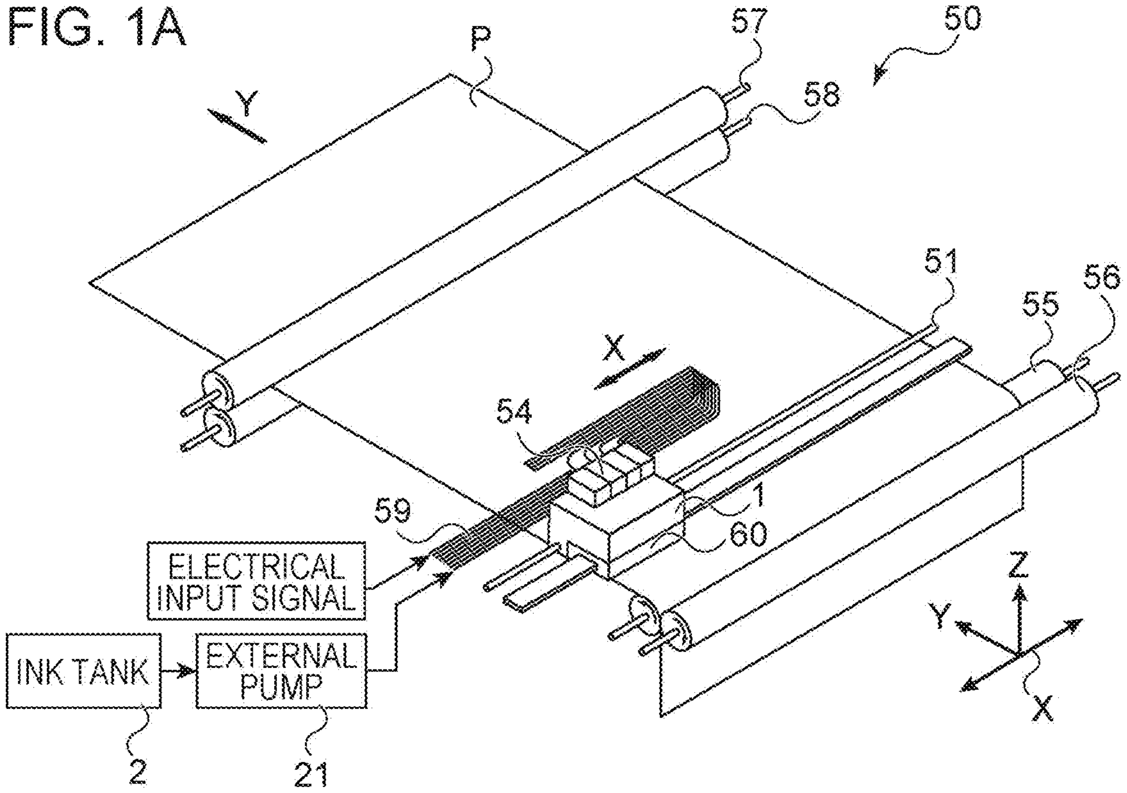
FIGS. 1A and 1B are explanatory views of a liquid ejection apparatus.

When a pump is provided inside a head, the size of the pump should be taken into consideration. This is more specifically described below. To achieve the circulation effects described above (discharge of air bubbles, suppression of thickening of ink, and the like), it is necessary to secure a circulatory flow rate for exhibiting the effects as pump capacity. However, a simple increase in the circulatory flow rate requires a larger pump. In particular, in a piezoelectric pump, the pump capacity depends on the amount of displacement of a piezoelectric element, and it is necessary to increase the size of the piezoelectric element, resulting in an increase in the size of the piezoelectric pump. At this time, the pump size allowable in designing is smaller in a pump inside a head than a pump outside the head, such as a pump in the main body. Thus, to provide a pump inside a head, it is required to design the pump to be as small as possible by clarifying the circulatory flow rate to achieve circulation effects and clarifying the minimum pump capacity necessary for the circulatory flow rate, instead of designing a pump to unnecessarily increase the circulatory flow rate, which increases the size of the pump.

In liquid ejection apparatuses described in Japanese Patent Laid-Open Publication No. 2014-195932 and Japanese Patent Laid-Open Publication No. 2019-059046, however, the circulatory flow rate and the size of a piezoelectric pump inside a head are not considered. More specifically, even the flow rate of a piezoelectric pump is not described, and when it is necessary to increase the circulatory flow rate, it may be necessary to increase the size of a pump.

In view of the above, the present disclosure provides a liquid ejection head and a liquid ejection apparatus that can effectively achieve circulation effects without increasing the size of a pump provided inside a head.

One or more embodiments of the present disclosure are described in detail below with reference to the accompanying drawings. The following embodiment(s) do not limit the matters of the present disclosure, and not all combinations of features described in the present embodiment(s) are necessarily essential for the solving means of the present disclosure. The same constituent element is denoted by the same reference numeral. Although an example employing a thermal system of generating air bubbles using an electrothermal converting element and thereby ejecting liquid is described as an ejection element for ejecting liquid in the present embodiment, the present disclosure is not limited thereto. The present disclosure can also be applied to a liquid ejection head that employs an ejection method for ejecting liquid using a piezoelectric element (piezo) or another ejection method. Furthermore, a pump, a pressure regulation unit, and the like described below are not limited to those described in the embodiments and the drawings. In the following description, first, a basic configuration of the present disclosure is described, and features of the present disclosure are then described.

<Liquid Ejection Apparatus>

Figure 1B:
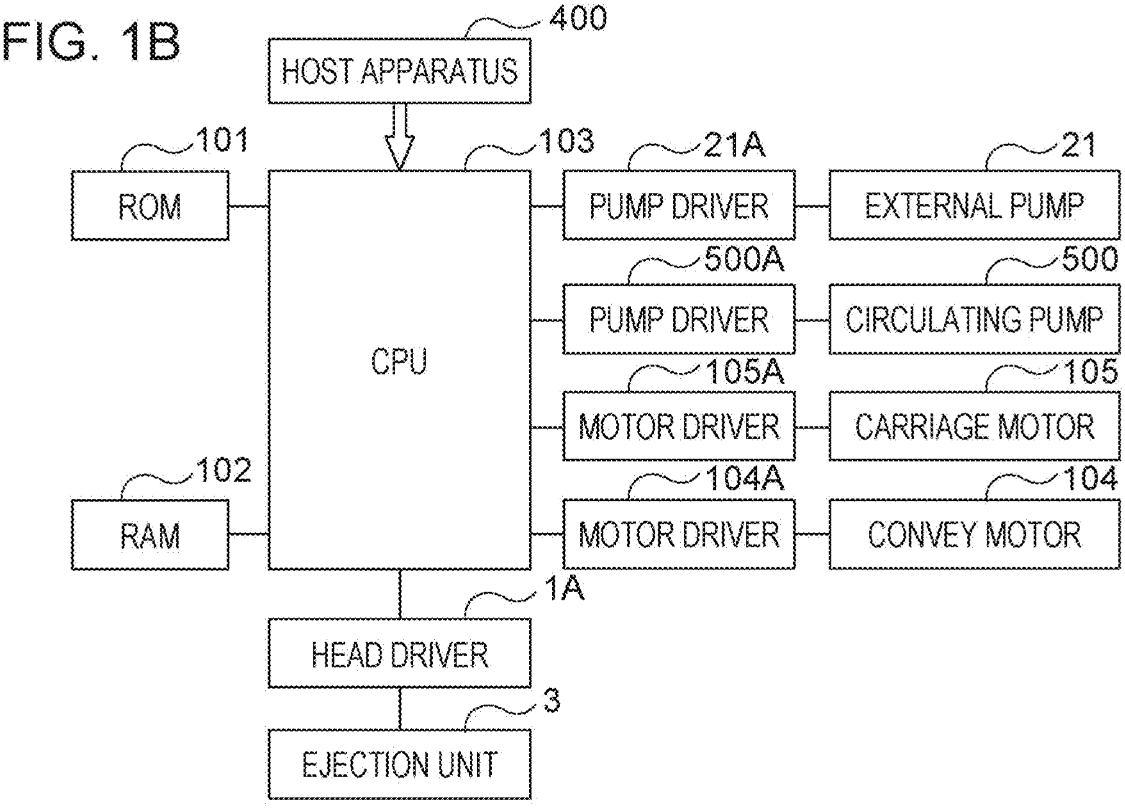

FIGS. 1A and 1B are explanatory views of a liquid ejection apparatus, and FIG. 1A is an enlarged view of a liquid ejection head of the liquid ejection apparatus and the periphery thereof. First, a schematic configuration of a liquid ejection apparatus 50 according to the present embodiment is described with reference to FIG. 1A. FIG. 1A is a schematic perspective view of a liquid ejection apparatus including a liquid ejection head 1. The liquid ejection apparatus 50 according to the present embodiment constitutes a serial ink jet recording apparatus that ejects ink as liquid while moving the liquid ejection head 1 for recording on a record medium P.

The liquid ejection head 1 is mounted on a carriage 60. The carriage 60 reciprocates along a guide shaft 51 in the main scanning direction (in the X direction). The record medium P is conveyed by conveying rollers 55, 56, 57, and 58 in a sub-scanning direction (in the Y direction) intersecting (in this example, orthogonal to) the main scanning direction. In each drawing referred to below, the Z direction indicates the vertical direction and intersects (in this example, is orthogonal to) the X-Y plane defined by the X direction and the Y direction. The liquid ejection head 1 is configured to be detachable from and attachable to the carriage 60 by a user.

The liquid ejection head 1 includes a circulation unit 54 and an ejection unit 3 described later (see FIG. 2). Although a specific configuration is described later, the ejection unit 3 includes a plurality of ejection ports and an energy-generating element (hereinafter referred to as the ejection element) that generates ejection energy required to eject liquid from each ejection port.

The liquid ejection apparatus 50 includes an ink tank 2 as an ink supply source, and an external pump 21. The ink stored in the ink tank 2 is supplied to the circulation unit 54 through an ink supply tube 59 by a driving force of the external pump 21.

The liquid ejection apparatus 50 forms a predetermined image on the record medium P by repeating print scan, in which the liquid ejection head 1 mounted on the carriage 60 ejects ink for recording while moving in the main scanning direction, and a conveying operation of conveying the record medium P in the sub-scanning direction. The liquid ejection head 1 in the present embodiment can eject four types of inks of black (K), cyan (C), magenta (M), and yellow (Y), and can record a full-color image with these inks. However, the inks that can be ejected from the liquid ejection head 1 are not limited to these four types of ink. The present disclosure is also applicable to a liquid ejection head for ejecting another type of ink. Thus, the liquid ejection head can eject any type and number of inks.

The liquid ejection apparatus 50 includes a cap member (not shown) at a position deviated from the conveying path of the record medium P in the X direction. The cap member can cover an ejection port surface on which the ejection ports of the liquid ejection head are formed. The cap member covers the ejection port surface of the liquid ejection head 1 during a non-print operation and is used to prevent the ejection ports from drying or protect the ejection ports, is used for an ink suction operation from the ejection ports, or is used for another purpose.

Although the liquid ejection head 1 in FIG. 1A includes four circulation units 54 corresponding to four types of ink, the liquid ejection head 1 only needs to include the circulation units 54 corresponding to the types of liquid to be ejected. Furthermore, a plurality of circulation units 54 may be provided for the same type of liquid. In other words, the liquid ejection head 1 can be configured to include one or more circulation units. Instead of circulating all the four types of inks, only at least one ink may be circulated.

FIG. 1B is a block diagram of a control system of the liquid ejection apparatus 50. CPU 103 functions as a control unit that controls the operation of each unit of the liquid ejection apparatus 50 on the basis of a program, such as a procedure, stored in ROM 101. RAM 102 is used as a work area or the like when the CPU 103 executes processing. The CPU 103 receives image data from a host apparatus 400 outside the liquid ejection apparatus 50, controls a head driver 1A, and controls the driving of the ejection element in the ejection unit 3. The CPU 103 also controls drivers of various actuators in the liquid ejection apparatus. For example, the CPU 103 controls a motor driver 105A of a carriage motor 105 for moving the carriage 60, a motor driver 104A of a convey motor 104 for conveying the record medium P, and the like. The CPU 103 also controls a pump driver 500A for driving a circulating pump 500 described later, a pump driver 21A for the external pump 21, and the like. Although FIG. 1B illustrates processing performed upon receiving image data from the host apparatus 400, the liquid ejection apparatus 50 may perform processing without data from the host apparatus 400.

<Basic Configuration of Liquid Ejection Head>

Figure 2:
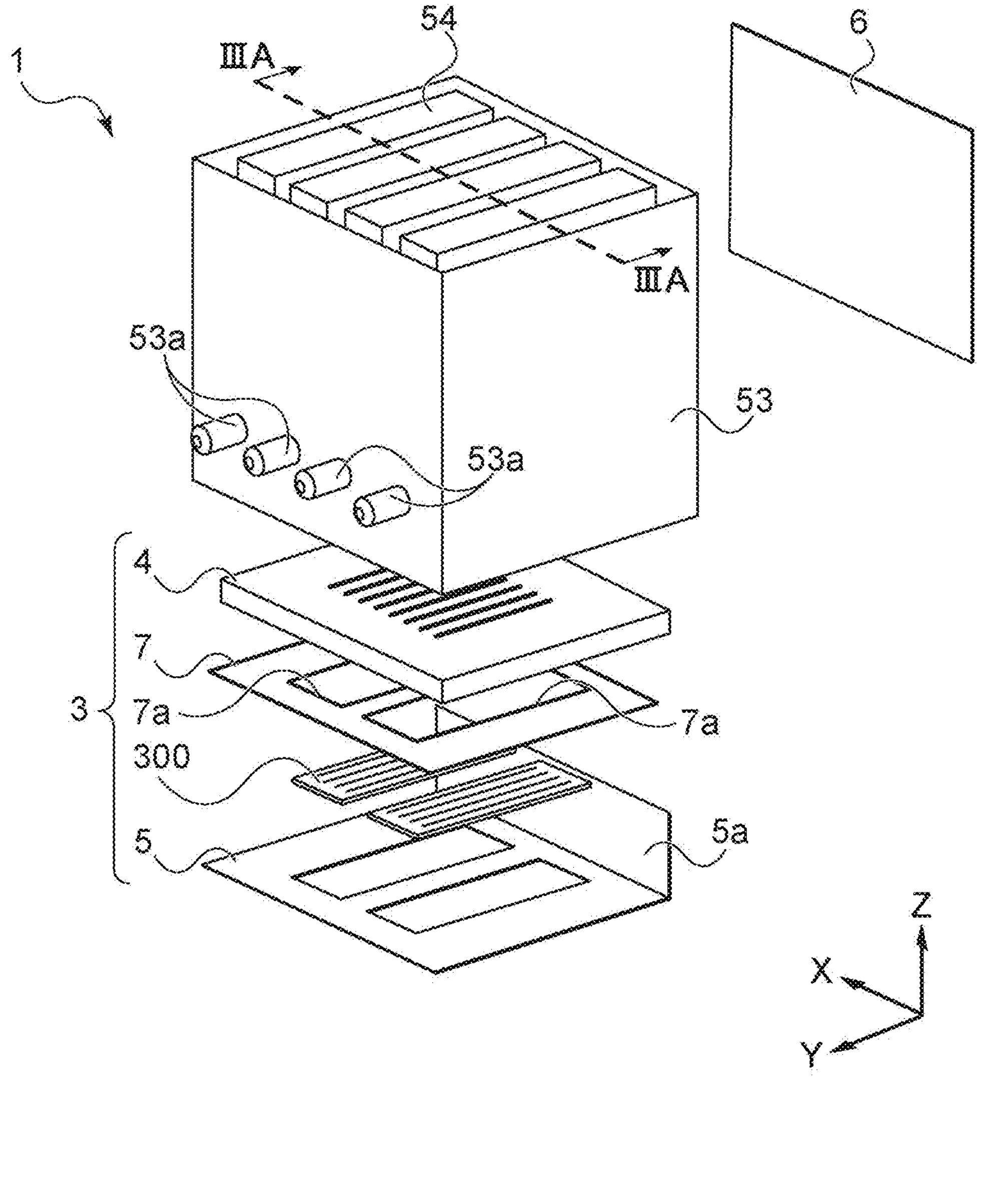
FIG. 2 is an exploded perspective view of a liquid ejection head.
Figure 3A:
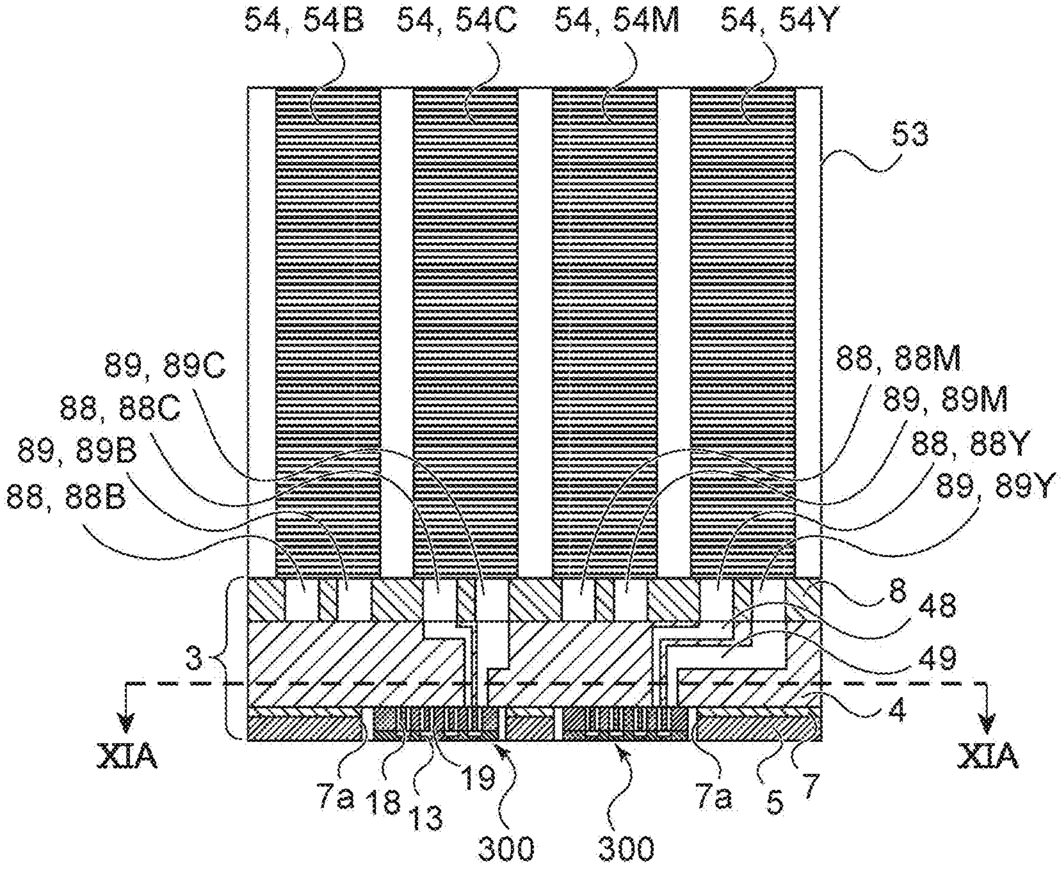
FIG. 3A is a vertical sectional view of a liquid ejection head.
Figure 3B:
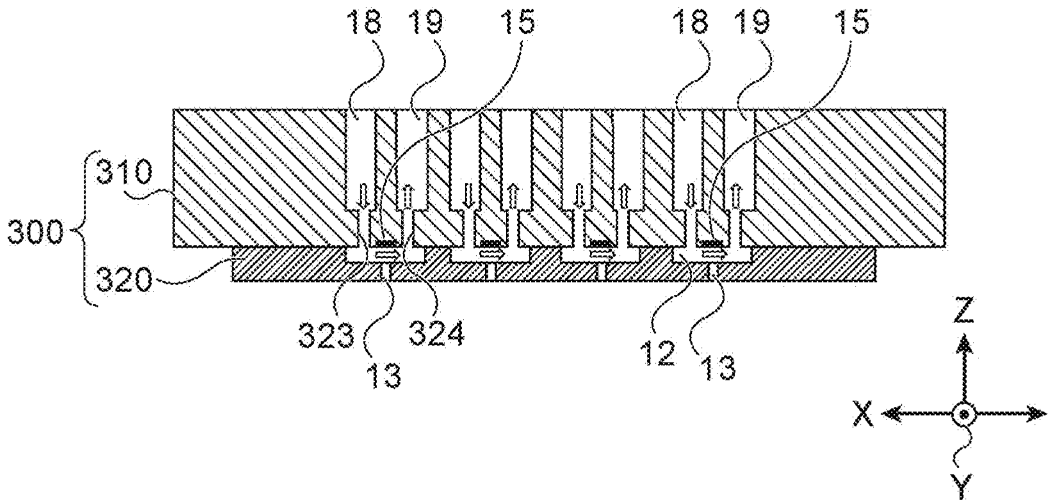
FIG. 3B is an enlarged cross-sectional view of an ejection module.

FIG. 2 is an exploded perspective view of the liquid ejection head 1 according to the present embodiment. FIG. 3A is a cross-sectional view taken along the line IIIA-IIIA of the liquid ejection head 1 illustrated in FIG. 2. FIG. 3A is an overall vertical sectional view of the liquid ejection head 1, and FIG. 3B is an enlarged view of an ejection module illustrated in FIG. 3A. The basic configuration of the liquid ejection head 1 according to the present embodiment is described below mainly with reference to FIG. 2 and FIGS. 3A and 3B, appropriately referring to FIG. 1.

As illustrated in FIG. 2, the liquid ejection head 1 includes the circulation unit 54 and the ejection unit 3 for ejecting the ink supplied from the circulation unit 54 onto the record medium P. The liquid ejection head 1 according to the present embodiment is fixed to and supported by the carriage 60 of the liquid ejection apparatus 50 using a positioning unit and an electrical contact (not shown) provided in the carriage 60. The liquid ejection head 1 ejects ink for recording on the record medium P while moving together with the carriage 60 in the main scanning direction (in the X direction) illustrated in FIG. 1.

The external pump 21 connected to the ink tank 2 serving as an ink supply source is provided with the ink supply tube 59 (see FIG. 1). A liquid connector (not shown) is provided at a tip of the ink supply tube 59. When the liquid ejection head 1 is mounted on the liquid ejection apparatus 50, the liquid connector provided at a tip of the ink supply tube 59 is hermetically connected to a liquid connector insertion slot 53*a*, which is a liquid inlet provided in a head housing 53 of the liquid ejection head 1. This forms an ink supply channel from the ink tank 2 to the liquid ejection head 1 through the external pump 21. In the present embodiment using the four types of ink, four sets of the ink tank 2, the external pump 21, the ink supply tube 59, and the circulation unit 54 are provided for each ink, and four ink supply channels for each ink are independently formed. Thus, the liquid ejection apparatus 50 according to the present embodiment includes an ink supply system to which ink is supplied from the ink tank 2 outside the liquid ejection head 1. The liquid ejection apparatus 50 according to the present embodiment is not provided with an ink collection system for collecting ink in the liquid ejection head 1 to the ink tank 2. Thus, the liquid ejection head 1 has the liquid connector insertion slot 53*a* for connecting the ink supply tube 59 of the ink tank 2 but has no connector insertion slot for connecting a tube for collecting the ink in the liquid ejection head 1 to the ink tank 2. The liquid connector insertion slot 53*a* is provided for each ink.

In FIG. 3A, 54B denotes a black ink circulation unit, 54C denotes a cyan ink circulation unit, 54M denotes a magenta ink circulation unit, and 54Y denotes a yellow ink circulation unit. Each circulation unit has almost the same configuration. When the circulation units are not particularly distinguished in the present embodiment, each circulation unit is referred to as the circulation unit 54.

In FIGS. 2 and 3A, the ejection unit 3 includes two ejection modules 300, a first supporting member 4, a second supporting member 7, an electric wiring member (electric wiring tape) 5, and an electric contact substrate 6. As illustrated in FIG. 3B, each ejection module 300 includes a silicon substrate 310 with a thickness in the range of 0.5 to 1 mm and a plurality of ejection elements 15 on one surface of the silicon substrate 310. Each ejection element 15 in the present embodiment is composed of an electrothermal transducer element (heater) that generates thermal energy as ejection energy required to eject liquid. Electric power is supplied to each ejection element 15 via electric wiring formed on the silicon substrate 310 by a film-forming technique.

An ejection-port-forming member 320 is formed on the front surface (the lower surface in FIG. 3B) of the silicon substrate 310. The ejection-port-forming member 320 has a plurality of pressure chambers 12 corresponding to the plurality of ejection elements 15 and a plurality of ejection ports 13 for ejecting ink formed by photolithography. Furthermore, the silicon substrate 310 has a common supply channel 18 and a common collecting channel 19. The silicon substrate 310 also has a supply connection channel 323 that communicates the common supply channel 18 with each pressure chamber 12, and a collection connection channel 324 that communicates the common collecting channel 19 with each pressure chamber 12. In the present embodiment, one ejection module 300 is configured to eject two types of ink. Thus, of the two ejection modules illustrated in FIG. 3A, the ejection module 300 on the left side in the drawing ejects a black ink and a cyan ink, and the ejection module 300 on the right side in the drawing ejects a magenta ink and a yellow ink. This combination is an example, and any combination of inks may be used. One ejection module may be configured to eject one type of ink or may be configured to eject three or more types of ink. The two ejection modules 300 are not necessarily eject the same number of types of ink. One ejection module 300 may be provided, or three or more ejection modules 300 may be provided. Furthermore, in the example illustrated in FIGS. 3A and 3B, two ejection port arrays extending in the Y direction are formed for one color of ink. The pressure chamber 12, the common supply channel 18, and the common collecting channel 19 are formed for each of the plurality of ejection ports 13 constituting each ejection port array.

An ink supply port and an ink collection port described later are formed on the back surface (the upper surface in FIG. 3B) side of the silicon substrate 310. The ink supply port supplies ink from the ink supply channel 48 to a plurality of common supply channels 18, and the ink collection port collects ink from a plurality of common collecting channels 19 to an ink collecting channel 49.

The ink supply port and the ink collection port refer to openings for supplying and collecting ink during ink circulation in the forward direction described later. Thus, during ink circulation in the forward direction, the ink is supplied from the ink supply port to each common supply channel 18 and is collected from each common collecting channel 19 to the ink collection port. The ink may also be circulated in the opposite direction. In such a case, the ink is supplied from the ink collection port described above to the common collecting channel 19 and is collected from the common supply channel 18 to the ink supply port.

As illustrated in FIG. 3A, the back surface (the upper surface in FIG. 3A) of each ejection module 300 is attached and fixed to one surface (the lower surface in FIG. 3A) of the first supporting member 4. The first supporting member 4 has the ink supply channel 48 and the ink collecting channel 49 penetrating from one surface to the other surface thereof.

One opening of the ink supply channel 48 communicates with the ink supply port in the silicon substrate 310, and one opening of the ink collecting channel 49 communicates with the ink collection port in the silicon substrate 310. The ink supply channel 48 and the ink collecting channel 49 are independently provided for each type of ink.

The second supporting member 7 with an opening 7*a* (see FIG. 2) through which each ejection module 300 is inserted is attached and fixed to one surface (the upper surface in FIG. 3A) of the first supporting member 4. The second supporting member 7 holds the electric wiring member 5 electrically connected to the ejection modules 300. The electric wiring member 5 is a member for applying an electric signal for ejecting ink to the ejection modules 300. An electrical connection portion between the ejection modules 300 and the electric wiring member 5 is sealed with a sealant (not shown) and is protected from corrosion due to ink and external impact.

An end portion 5*a* (see FIG. 2) of the electric wiring member 5 is thermocompression-bonded to the electric contact substrate 6 using an anisotropic conductive film (not shown), and the electric wiring member 5 is electrically connected to the electric contact substrate 6. The electric contact substrate 6 has an external-signal input terminal (not shown) for receiving an electric signal from the liquid ejection apparatus 50.

Furthermore, a joint member 8 (FIG. 3A) is provided between the first supporting member 4 and the circulation unit 54. The joint member 8 has a supply port 88 and a collection port 89 for each type of ink. The supply port 88 and the collection port 89 allow the ink supply channel 48 and the ink collecting channel 49 of the first supporting member 4 to communicate with a channel formed in the circulation unit 54. In FIG. 3A, a supply port 88B and a collection port 89B are provided for a black ink, and a supply port 88C and a collection port 89C are provided for a cyan ink. A supply port 88M and a collection port 89M are provided for a magenta ink, and a supply port 88Y and a collection port 89Y are provided for a yellow ink.

The opening at one end portion of each of the ink supply channel 48 and the ink collecting channel 49 of the first supporting member 4 has a small opening area corresponding to the ink supply port and the ink collection port of the silicon substrate 310. On the other hand, the opening at the other end portion of each of the ink supply channel 48 and the ink collecting channel 49 of the first supporting member 4 has a shape enlarged to the same opening area as the large opening area of the joint member 8 fitted to the channel of the circulation unit 54. Such a configuration can reduce an increase in channel resistance to the ink collected from each collecting channel. The shapes of the openings at the one end portion and the other end portion of each of the ink supply channel 48 and the ink collecting channel 49 are not limited to these examples.

In the liquid ejection head 1 with the above configuration, the ink supplied to the circulation unit 54 flows into the common supply channel 18 from the ink supply port of each ejection module 300 through the supply port 88 of the joint member 8 and the ink supply channel 48 of the first supporting member 4. Subsequently, the ink flows from the common supply channel 18 into the pressure chamber 12 through the supply connection channel 323, and the ink flowed into the pressure chamber is partially ejected from the ejection port 13 by the driving of the ejection element 15. The residual ink not ejected flows from the pressure chamber 12 into the ink collecting channel 49 of the first supporting member 4 through the collection connection channel 324, the common collecting channel 19, and the ink collection port. The ink flowed into the ink collecting channel 49 then flows into the circulation unit 54 through the collection port 89 of the joint member 8 and is collected.

<Constituent Element of Circulation Unit>

Figure 4:
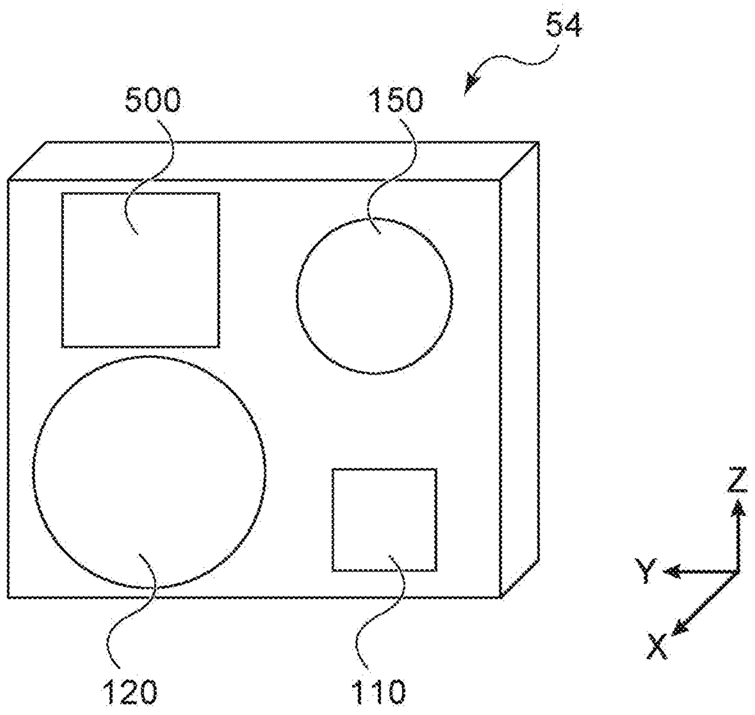
FIG. 4 is a schematic external view of a circulation unit.
Figure 5:
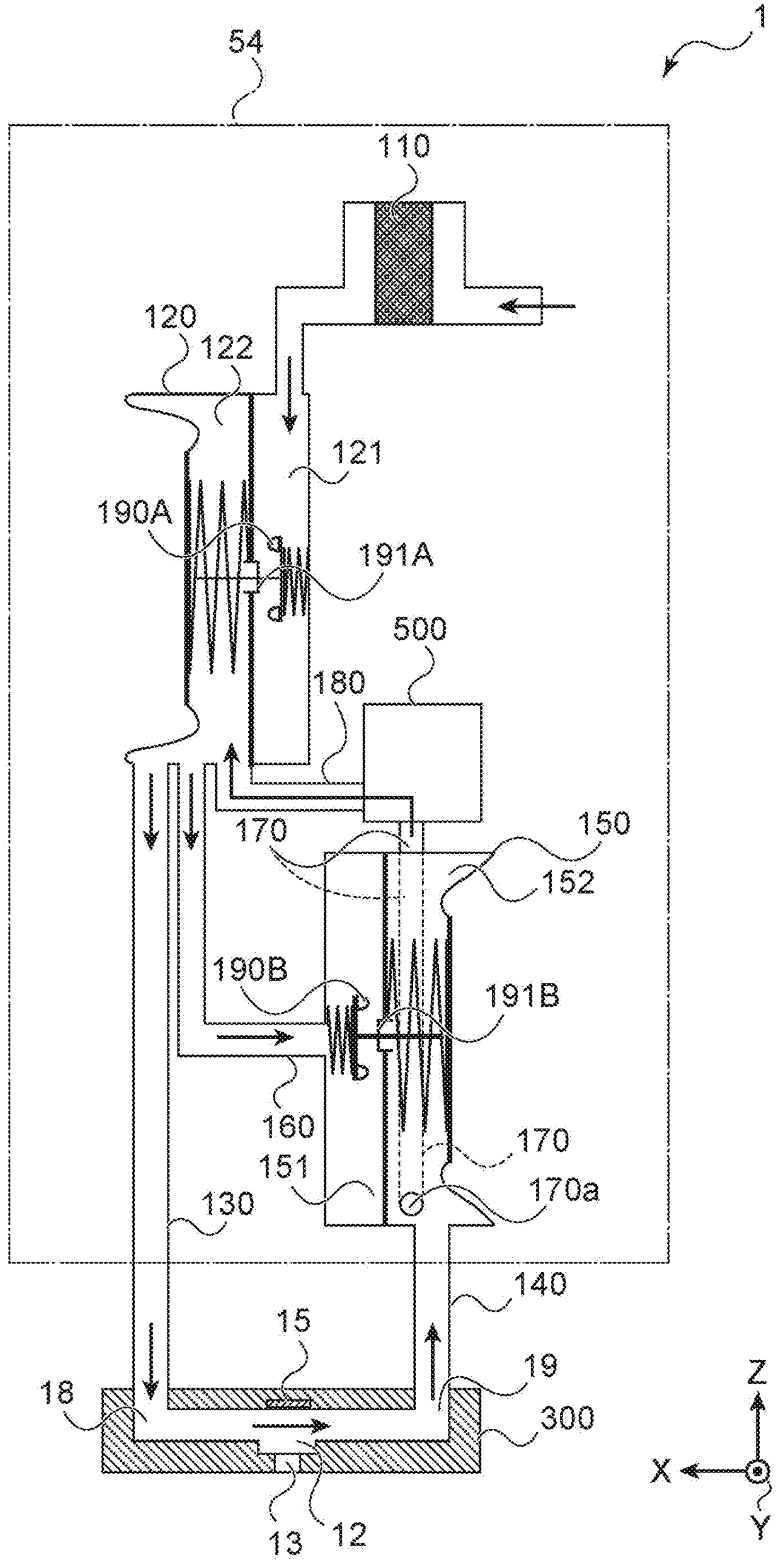
FIG. 5 is a vertical sectional view of a circulation path.
Figure 6:
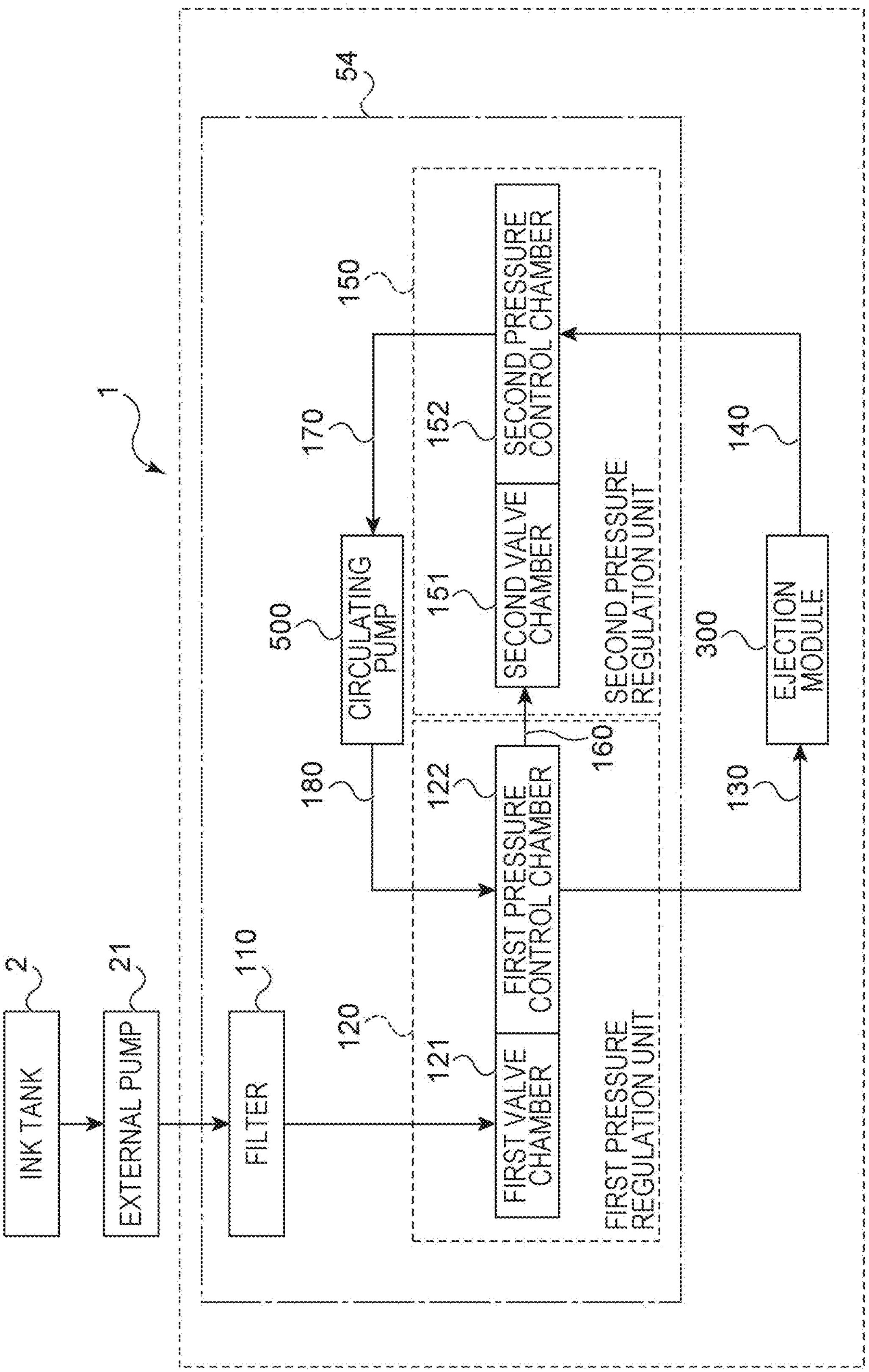
FIG. 6 is a schematic block diagram of a circulation path.

FIG. 4 is a schematic external view of one circulation unit 54 for one type of ink applied to the recording apparatus of the present embodiment. The circulation unit 54 can include a filter 110, a first pressure regulation unit 120, and a second pressure regulation unit 150, in addition to the circulating pump 500. As illustrated in FIGS. 5 and 6, these constituent elements are connected in each channel and constitute a circulation path for supplying and collecting ink to and from the ejection module 300 in the liquid ejection head 1.

<Circulation Path in Liquid Ejection Head>

FIG. 5 is a schematic vertical sectional view of a circulation path of one type of ink (one color ink) in the liquid ejection head 1. To more clearly describe the circulation path, the relative position of each configuration (the first pressure regulation unit 120, the second pressure regulation unit 150, the circulating pump 500, or the like) in FIG. 5 is simplified. Thus, each configuration has a different relative position from the configuration of FIG. 19 described later. FIG. 6 is a schematic block diagram of the circulation path illustrated in FIG. 5. As illustrated in FIGS. 5 and 6, the first pressure regulation unit 120 includes a first valve chamber 121 and a first pressure control chamber 122. The second pressure regulation unit 150 includes a second valve chamber 151 and a second pressure control chamber 152. The first pressure regulation unit 120 is configured to have a relatively higher control pressure than the second pressure regulation unit 150. In the present embodiment, the two pressure regulation units 120 and 150 are used for circulation in the circulation path in a certain pressure range. Ink flows through the pressure chamber 12 (the ejection element 15) at a flow rate corresponding to the pressure difference between the first pressure regulation unit 120 and the second pressure regulation unit 150. The circulation path in the liquid ejection head 1 and the ink flow in the circulation path are described below with reference to FIGS. 5 and 6. The arrows in the drawings indicate the ink flow directions.

First, the connection state of each constituent element in the liquid ejection head 1 is described.

The external pump 21 that sends the ink contained in the ink tank 2 (FIG. 6) provided outside the liquid ejection head 1 to the liquid ejection head 1 is connected to the circulation unit 54 through the ink supply tube 59 (FIG. 1). The filter 110 is provided in the ink channel (inflow channel) located on the upstream side of the circulation unit 54. The ink supply channel (inflow channel) on the downstream side of the filter 110 is connected to the first valve chamber 121 of the first pressure regulation unit 120. The first valve chamber 121 communicates with the first pressure control chamber 122 through a communication port 191A that can be opened and closed with a valve 190A illustrated in FIG. 5. The inflow channel is a channel through which the liquid in the ink tank 2 outside the liquid ejection head 1 flows into the liquid ejection head 1 to be supplied to the pressure chamber 12.

The first pressure control chamber 122 is connected to a supply channel 130, a bypass 160, and a pump outlet channel 180 of the circulating pump 500. The supply channel 130 is connected to the common supply channel 18 through the ink supply port provided in the ejection module 300. The bypass 160 is connected to the second valve chamber 151 provided in the second pressure regulation unit 150. The second valve chamber 151 communicates with the second pressure control chamber 152 through a communication port 191B that can be opened and closed with a valve 190B illustrated in FIG. 5. In an example illustrated in FIGS. 5 and 6, one end of the bypass 160 is connected to the first pressure control chamber 122 of the first pressure regulation unit 120, and the other end of the bypass 160 is connected to the second valve chamber 151 of the second pressure regulation unit 150. One end of the bypass 160 may be connected to the supply channel 130, and the other end of the bypass 160 may be connected to the second valve chamber 151.

The second pressure control chamber 152 is connected to a collecting channel 140. The collecting channel 140 is connected to the common collecting channel 19 through the ink collection port provided in the ejection module 300. Furthermore, the second pressure control chamber 152 is connected to the circulating pump 500 through a pump inlet channel 170. In FIG. 5, 170*a* denotes an inlet port of the pump inlet channel 170.

Next, the ink flow in the liquid ejection head 1 with the above configuration is described. As illustrated in FIG. 6, the ink in the ink tank 2 is pressurized by the external pump 21 in the liquid ejection apparatus 50 and is supplied to the circulation unit 54 of the liquid ejection head 1 as a positive pressure ink flow.

The ink supplied to the circulation unit 54 flows through the filter 110 to remove a foreign substance, such as dust, and air bubbles and then flows into the first valve chamber 121 in the first pressure regulation unit 120 Although the pressure of the ink decreases due to the pressure drop during passage through the filter 110, the pressure of the ink at this stage is in a positive pressure state. When the valve 190A is in the open state, the ink flowed into the first valve chamber 121 flows through the communication port 191A into the first pressure control chamber 122. A pressure drop during passage through the communication port 191A changes the pressure of the ink flowed into the first pressure control chamber 122 from positive to negative.

Next, the ink flow in the circulation path is described. The circulating pump 500 operates such that the ink sucked from the pump inlet channel 170 on the upstream side is sent to the pump outlet channel 180 on the downstream side. Thus, when the pump is driven, the ink supplied to the first pressure control chamber 122 flows into the supply channel 130 and the bypass 160 together with the ink sent from the pump outlet channel 180. Although details are described later, in the present embodiment, a piezoelectric diaphragm pump including a piezoelectric element attached to a diaphragm as a driving source is used as a circulating pump capable of feeding liquid. The piezoelectric diaphragm pump feeds liquid by inputting a driving voltage to the piezoelectric element to change the volume of the pump chamber and causing a pressure change to alternately move two check valves.

The ink flowed into the supply channel 130 flows from the ink supply port of the ejection module 300 into the pressure chamber 12 through the common supply channel 18, and the ink is partially ejected from the ejection port 13 by the driving (heat generation) of the ejection element 15. Furthermore, the residual ink not ejected flows through the pressure chamber 12 and the common collecting channel 19 and then flows into the collecting channel 140 connected to the ejection module 300. The ink flowed into the collecting channel 140 flows into the second pressure control chamber 152 of the second pressure regulation unit 150.

On the other hand, the ink flowed into the bypass 160 from the first pressure control chamber 122 flows into the second valve chamber 151 and then into the second pressure control chamber 152 through the communication port 191B. The ink flowed into the second pressure control chamber 152 through the bypass 160 and the ink collected from the collecting channel 140 are sucked into the circulating pump 500 through the pump inlet channel 170 by the driving of the circulating pump 500. The ink sucked into the circulating pump 500 is then sent to the pump outlet channel 180 and flows into the first pressure control chamber 122 again. Subsequently, the ink flowed from the first pressure control chamber 122 into the second pressure control chamber 152 through the supply channel 130 and through the ejection module 300 and the ink flowed into the second pressure control chamber 152 through the bypass 160 flow into the circulating pump 500. The ink is then sent from the circulating pump 500 to the first pressure control chamber 122. In this way, the ink is circulated in the circulation path.

As described above, in the present embodiment, the circulating pump 500 can circulate the liquid along the circulation path in the liquid ejection head 1. This can suppress the thickening of ink and the accumulation of a precipitated component of ink in a coloring material in the ejection module 300, and maintain the fluidity of the ink in the ejection module 300 and the ejection characteristics in the ejection port in a good state.

The circulation path in the present embodiment is completed in the liquid ejection head 1 and can therefore be much shorter than that between the ink tank 2 outside the liquid ejection head 1 and the liquid ejection head 1. Thus, the ink can be circulated with a small circulating pump.

Furthermore, the connection channel between the liquid ejection head 1 and the ink tank 2 is only a channel for supplying ink. Thus, a channel for collecting ink from the liquid ejection head 1 to the ink tank 2 is not necessary. Thus, to connect the ink tank 2 and the liquid ejection head 1, only an ink supply tube is sufficient, and an ink collection tube is not necessary. Thus, the liquid ejection apparatus 50 can have a simple interior with a reduced number of tubes, and the entire apparatus can be miniaturized. Furthermore, the reduced number of tubes can result in a reduced fluctuation in ink pressure caused by the oscillation of a tube accompanying main scanning with the liquid ejection head 1. The oscillation of a tube during main scanning with the liquid ejection head 1 causes a driving load on the carriage motor that drives the carriage 60. Thus, the reduced number of tubes can result in a reduced driving load on the carriage motor and a simplified main scanning mechanism including the carriage motor and the like. Furthermore, since it is not necessary to collect the ink from the liquid ejection head to the ink tank, the external pump 21 can be miniaturized. Thus, the present embodiment can reduce the size and cost of the liquid ejection apparatus 50.

<Pump Flow Rate>

In general, the purpose of a circulatory flow in a channel may be (i) discharge of bubbles, (ii) suppression of precipitation, and (iii) suppression of ink concentration due to evaporation at an ejection port. In particular, the circulatory flow velocity is increased to make (iii) suppression of ink concentration due to evaporation at an ejection port more effective than (i) and (ii). Furthermore, it is known to depend greatly on the structure of an ejection port portion.

Thus, when the circulatory flow rate is increased, the problem is less likely to be significant in a configuration with a pump outside the head, such as a pump in the main body. In contrast, a pump or a pressure regulation mechanism inside the head as in the present disclosure tends to make the problem significant. Thus, it is required to design a pump to be as small as possible by clarifying the relationship between the circulatory flow rate to achieve circulation effects and the configuration of an ejection port portion, instead of designing a pump to unnecessarily increase the circulatory flow rate, which increases the size of the pump.

The following clarifies the relationship between the circulation effects on the configuration of an ejection port portion and the circulatory flow rate.

Description of the Vicinity of an Ejection Port

Figure 20A:
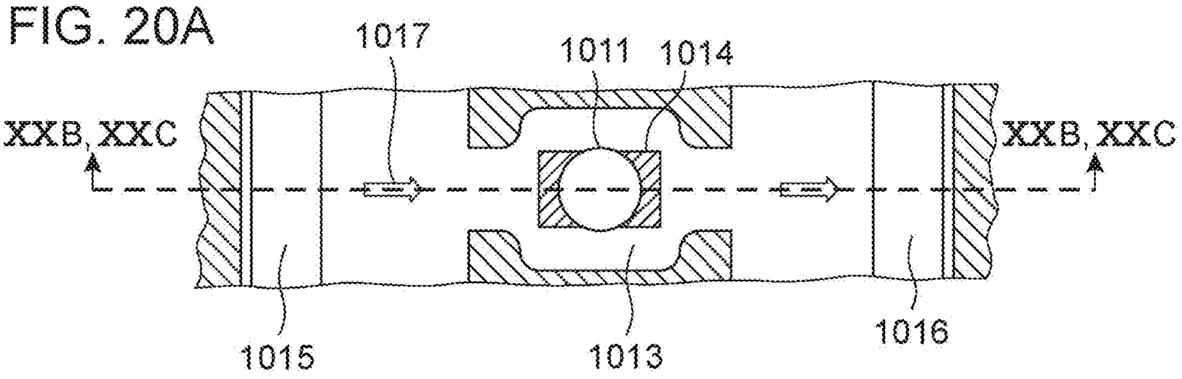
FIGS. 20A to 20C are schematic views of the vicinity of an ejection port of a liquid ejection head.
Figure 20B:
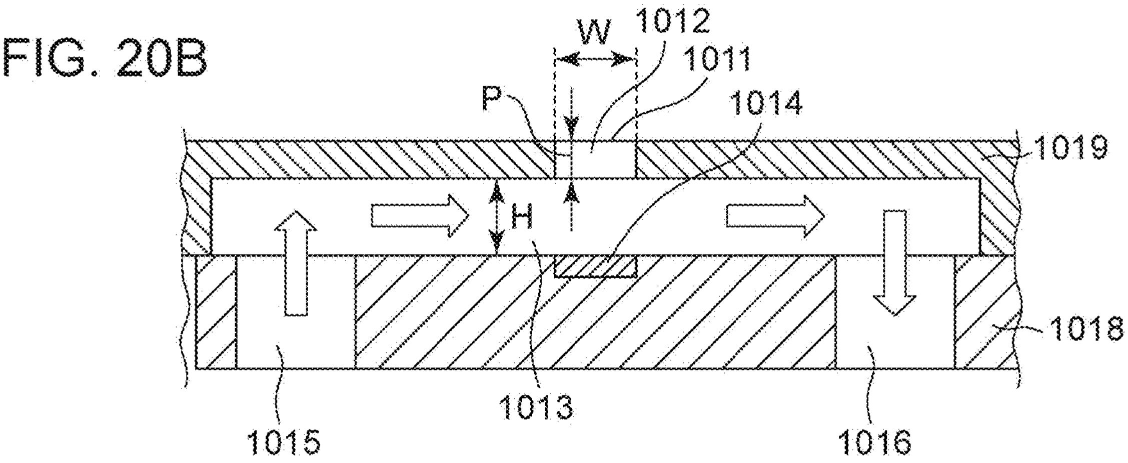
Figure 20C:
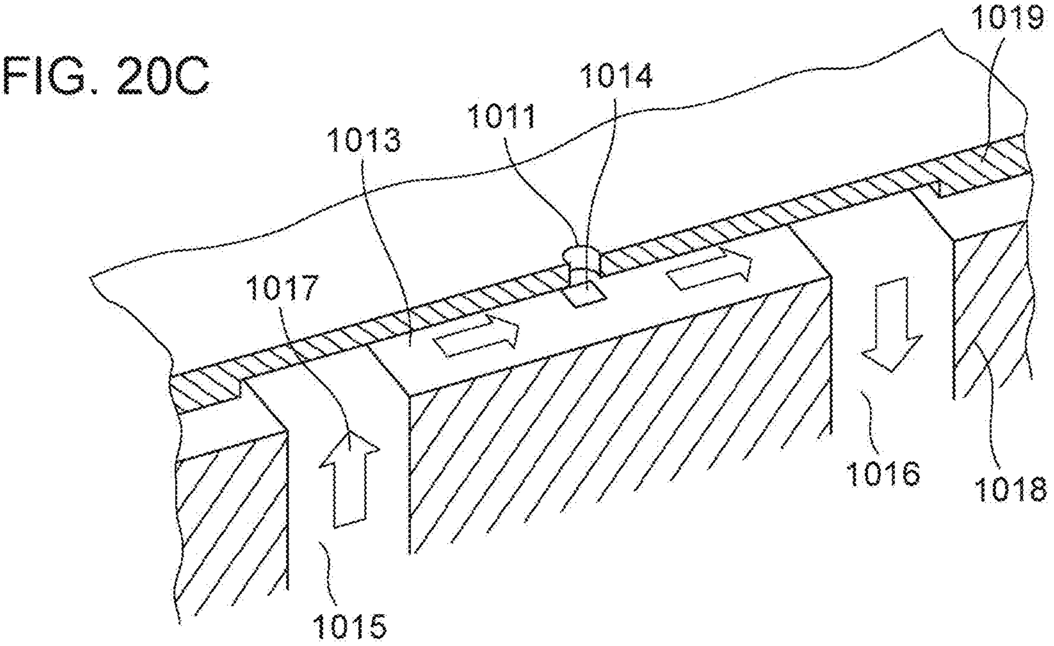

FIGS. 20A to 20C are schematic views illustrating in detail the vicinity of an ejection port of a liquid ejection head that ejects a liquid, such as ink, in the present embodiment. FIG. 20A is a plan view viewed in an ejection direction in which a liquid droplet is ejected from an ejection port, FIG. 20B is a cross-sectional view taken along the line XXB, XXC-XXB,XXC of FIG. 20A, and FIG. 20C is a cross-sectional perspective view taken along the line XXB,XXC-XXB,XXC of FIG. 20A.

In FIGS. 20A to 20C, the liquid ejection head includes an ejection port 1011 for ejecting liquid and an ejection element 1014 that is formed in a pressure chamber 1013 and generates energy required to eject liquid. Ink is supplied from one end to the other end in the pressure chamber, and the ejection port is formed in a region between the one end and the other end of the pressure chamber. An ink meniscus is formed in the ejection port, and an ejection port interface is formed at an interface between the ink and the atmosphere. In the present embodiment, an electrothermal transducer element (heater) driven as an ejection element generates air bubbles in liquid and ejects the liquid from the ejection port. The ejection element is not limited to the heater and may be an energy-generating element, such as a piezoelectric element. The liquid ejection head includes the supply connection channel 323 and the collection connection channel 324 as through-holes extending in a direction across the pressure chamber. Furthermore, the supply connection channel 323 communicates with a common supply channel 1015 (inflow opening), which is an inlet of liquid from the outside to the liquid ejection head, and the collection connection channel 324 communicates with a common collecting channel 1016 (outflow opening), which is an outlet of liquid from the liquid ejection head to the outside. Thus, the liquid ejection head has a liquid path through which liquid is supplied, in the order of the common supply channel (inflow opening), the supply connection channel, the pressure chamber/ejection port, the collection connection channel, and the common collecting channel (outflow opening). In the present embodiment, as described later, a so-called circulation path is formed in which liquid flowed out from the common collecting channel (outflow opening) to the outside of the liquid ejection head flows into the common supply channel of the liquid ejection head again, and a circulatory flow 1017 is formed in the liquid ejection head. In the present embodiment, while ink flows in the pressure chamber, the ejection element is driven to eject a droplet from the ejection port. The circulatory flow through the pressure chamber has a speed of, for example, approximately 0.1 to 100 mm/s, and even ejection operation while ink flows has little influence on landing accuracy and the like.

In FIG. 20B, the ejection element 1014 is formed in an element substrate 1018 made of silicon (Si), and the ejection port 1011 for ejecting liquid and an ejection port portion 1012 for communicating the ejection port with the pressure chamber are formed in an orifice plate 1019. In other words, the ejection port is an opening portion formed on the front surface of the orifice plate (the surface on the side from which a droplet is ejected), and the ejection port portion is a tubular portion that connects the ejection port and the pressure chamber.

Relationship Between P, W, and H

Next, the following describes the relationship between the height of the pressure chamber, the thickness of the orifice plate, and the length of the ejection port in the liquid ejection head according to the present embodiment, and a method for supplying ink in the liquid ejection head.

As illustrated in FIG. 20B, in the communication portion between the pressure chamber and the ejection port portion, the height of the pressure chamber on the upstream side in the flow direction of liquid in the pressure chamber is defined as H, and the length of the ejection port portion in the ejection direction of the liquid from the ejection port is defined as P. Furthermore, the length of the ejection port portion 1012 in the flow direction of liquid in the pressure chamber is defined as W. In the present embodiment, H ranges from 3 to 30 μm, P ranges from 3 to 30 μm, and W ranges from 6 to 30 μm.

Figure 21:
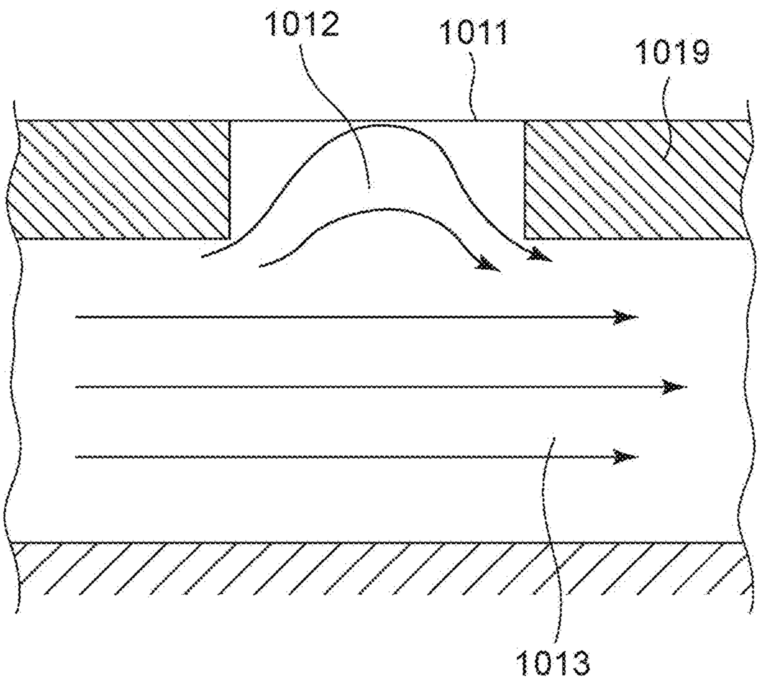
FIG. 21 is a schematic view of the state of a circulatory flow through a liquid ejection head.

FIG. 21 illustrates the state of the circulatory flow flowing through the liquid ejection head in a steady state in the ejection port 1011, the ejection port portion 1012, and the pressure chamber 1013. The length of the vector in this figure does not represent the amount of velocity but is constant for all velocity values. In FIG. 21, the arrows indicate ink flows when $1.26\times10^{-4}$ ml/min of ink flows from the supply connection channel 323 into the pressure chamber in the liquid ejection head with H of 14 μm, P of 5 μm, and W of 12.4 μm.

The present embodiment is configured as described below to suppress ink with a coloring material concentration changed by evaporation of ink from the ejection port from staying in the ejection port 13 and the ejection port portion 1012. More specifically, as illustrated in FIG. 21, the liquid ejection head according to the present embodiment has a circulatory flow, in which the circulatory flow of ink flowing through the pressure chamber flows into the ejection port portion 1012, reaches near the ejection port interface, and then returns to the pressure chamber through the ejection port portion 1012. The ink returned to the pressure chamber flows out to the outside of the liquid ejection head from the common collecting channel through the collection connection channel. In this way, a flow is formed in which the circulatory flow enters the inside of the ejection port portion, reaches the meniscus position (near the meniscus interface) in the ejection port, and then returns to the pressure chamber again. This enables not only the ink in the ejection port portion susceptible to evaporation but also the ink near the ejection port interface particularly susceptible to evaporation to flow out to the pressure chamber without staying in the ejection port portion.

The circulatory flow in the present embodiment characteristically has a velocity component in the flow direction (from left to right in FIG. 21) of the ink (hereinafter referred to as the positive velocity component) in the pressure chamber at least in the central portion near the ejection port interface (the central portion of the ejection port). In the present specification, a flow mode in which the circulatory flow has a positive velocity component at least in the central portion of the ejection port interface as illustrated in FIG. 21 is referred to as the flow mode A. As described later, as in a comparative example illustrated in FIGS. 23B and 23D, a flow mode with a negative velocity component (in the direction from right to left in FIG. 23B) opposite the positive velocity component in the central portion of the ejection port interface is referred to as the flow mode B.

Investigation by the present inventors showed that the liquid ejection head in the flow mode A in the present embodiment satisfies the following formula to suppress ink with a coloring material concentration changed by evaporation from stagnating in the ejection port. More specifically, the pressure chamber height H (the height of the pressure chamber near the upstream side of the portion where the pressure chamber and the ejection port portion communicate with each other), the ejection port length P, and the ejection port width W in FIG. 20 satisfy the following relational expression (1):

$$H^{-0.34} \times P^{-0.66} \times W > 1.7 \quad (1)$$

wherein the left side of the relational expression (1) is referred to as the decision value J. Investigation by the present inventors showed that the liquid ejection head satisfying the relational expression (1) has the flow mode A as illustrated in FIG. 21, and the liquid ejection head in the flow mode B does not satisfy the relational expression (1). The relational expression (1) is described with reference to FIGS. 22 to 24.

Figure 22:
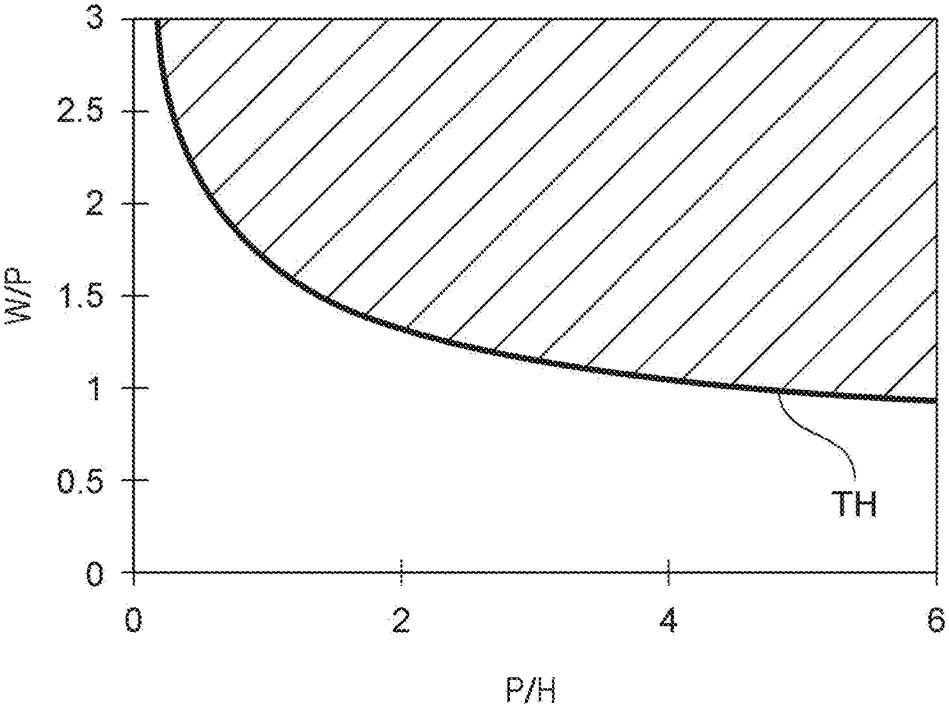
FIG. 22 is a graph of the relationship between a liquid ejection head in a flow mode A and a liquid ejection head in a flow mode B.

FIG. 22 shows the relationship between the liquid ejection head in the flow mode A and the liquid ejection head in the flow mode B. In FIG. 22, the horizontal axis represents the ratio of P to H (P/H), and the vertical axis represents the ratio of W to P (W/P). In the figure, TH denotes a threshold line, which satisfies the following relational expression (2):

$$\left(\frac{W}{P}\right) = 1.7 \times \left(\frac{P}{H}\right)^{-0.34} \quad (2)$$

It has been found that the liquid ejection head in which the relationship between H, P, and W is in the upper portion of the threshold line of the graph of FIG. 22 (the region of the solid oblique line) has the flow mode A, and the liquid ejection head in the lower portion of the threshold line has the flow mode B. Thus, the liquid ejection head satisfying the following relational expression (3) has the flow mode A.

$$\left(\frac{W}{P}\right) > 1.7 \times \left(\frac{P}{H}\right)^{-0.34} \quad (3)$$

The relational expression (3) is transformed into the relational expression (1). Thus, a head with the relationship between H, P, and W satisfying the relational expression (1) (a head with a decision value J of 1.7 or more) has the flow mode A.

Figure 23A:
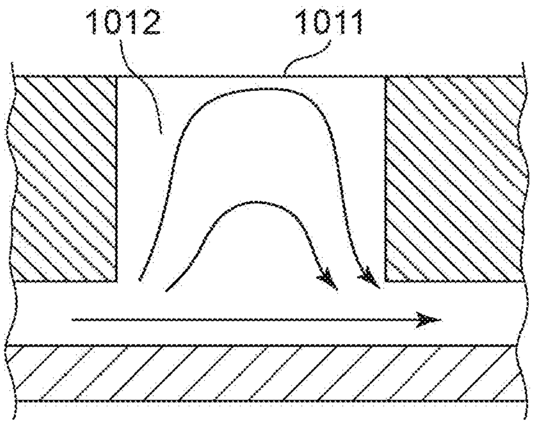
FIGS. 23A to 23D are schematic views of the state of a circulatory flow through a liquid ejection head.
Figure 23B:
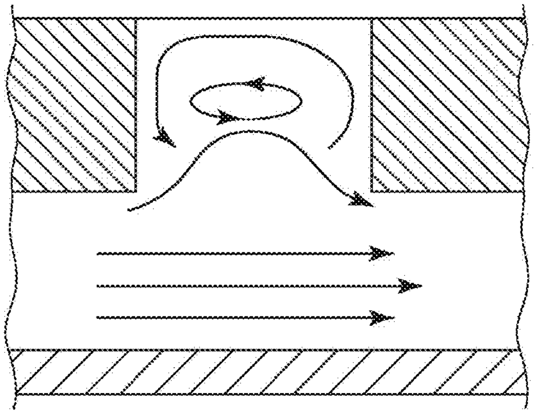
Figure 23C:
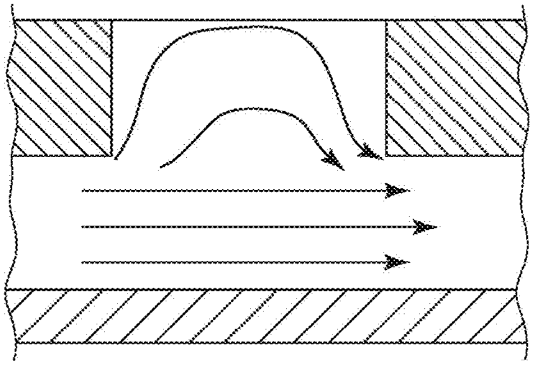
Figure 23D:
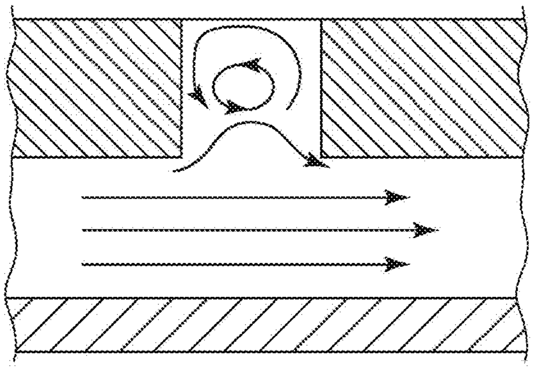
Figure 24:
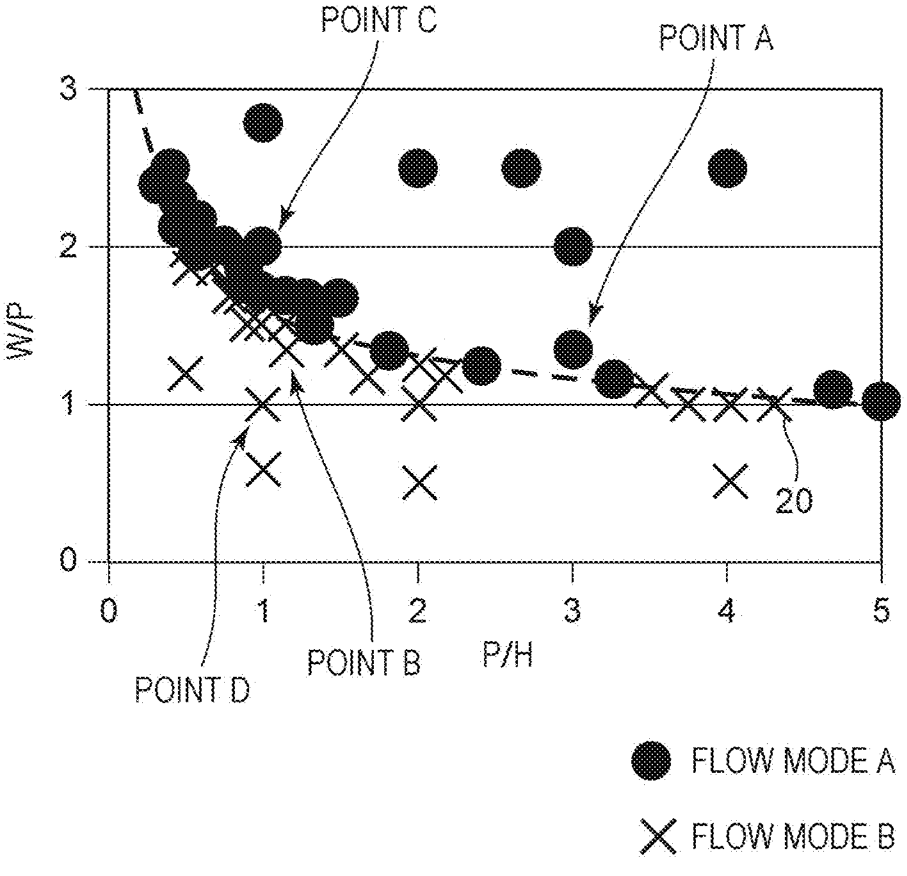
FIG. 24 is a graph of the results of judging the flow state in liquid ejection heads with various supply channel shapes.

The above relationship is examined with reference to FIGS. 23A to 23D and FIG. 24. Each liquid ejection head in FIGS. 23A to 23D is an example of the state of the circulatory flow near the ejection port portion of the liquid ejection head in the regions above and below the threshold line in FIG. 22. FIG. 24 shows the results of determining whether the flow mode is the flow mode A or the flow mode B by checking the flow state in liquid ejection heads with various supply channel shapes. In FIG. 24, filled circles indicate liquid ejection heads in the flow mode A, and cross marks indicate liquid ejection heads in the flow mode B.

FIG. 23A illustrates a liquid ejection head with H of 3 μm, P of 9 μm, and W of 12 μm, and the decision value J on the left side of the relational expression (1) is 1.93, which is larger than 1.7. The actual circulatory flow is found to have the flow mode A as illustrated in FIG. 23A. This corresponds to the point A in FIG. 24. Next, FIG. 23B illustrates a liquid ejection head with H of 8 μm, P of 9 μm, and W of 12 μm, and the decision value is 1.39, which is smaller than 1.7. The actual circulatory flow has the flow mode B. This corresponds to the point B in FIG. 24. FIG. 23C illustrates a liquid ejection head with H of 6 μm, P of 6 μm, and W of 12 μm, and the decision value is 2.0, which is larger than 1.7. The actual circulatory flow has the flow mode A. This corresponds to the point C in FIG. 24. Finally, FIG. 23D illustrates a liquid ejection head with H of 6 μm, P of 6 μm, and W of 6 μm, and the decision value is 1.0, which is smaller than 1.7. The actual circulatory flow has the flow mode B. This corresponds to the point D in FIG. 24.

In this manner, a liquid ejection head in the flow mode A and a liquid ejection head in the flow mode B can be separated with the threshold line in FIG. 22 as a boundary. More specifically, a liquid ejection head with a decision value J of the relational expression (1) larger than 1.7 has the flow mode A, and the circulatory flow has a positive velocity component at least in the central portion of the ejection port interface. The conditions of P, W, and H have a dominant influence on whether the circulatory flow in the ejection port has the flow mode A or the flow mode B. The other conditions, for example, the flow velocity of the circulatory flow 1017, the viscosity of ink, and the width of the ejection port in the direction perpendicular to the flow direction of the circulatory flow (the length of the ejection port in the direction orthogonal to W) have a much smaller influence than P, W, and H. Thus, the circulatory flow velocity and the viscosity of ink may be appropriately determined in accordance with the required specifications of the liquid ejection head (ink jet recording apparatus) and the environmental conditions under which the liquid ejection head is used. When an environmental change or the like increases the amount of ink evaporated from the ejection port during use, the flow rate of the circulatory flow can be appropriately increased to have the flow mode A. A liquid ejection head in the flow mode B cannot have the flow mode A no matter how much the flow rate is increased. In other words, whether the flow mode A or the flow mode B is dominantly determined not by the flow velocity of ink or the viscosity of ink but by the conditions of H, P, and W of the liquid ejection head. Furthermore, among various liquid ejection heads in the flow mode A, particularly, a liquid ejection head with H of 20 μm or less, P of 20 μm or less, and W of 30 μm or less can form a higher-resolution image.

Relationship between Decision Value J, Environment Temperature/Humidity, and Circulatory Flow Velocity The following describes the relationship between the decision value J and the concentration due to a change in the evaporation speed related to the environment temperature/humidity or in the circulatory flow velocity. The index of the concentration is expressed by the average concentration in the ejection port length P. The concentration at the pressure chamber height H does not depend on the flow modes A and B, and even a small circulatory flow causes advection, so that the influence is small. Thus, it is thought that the average in the ejection port length P is good.

To clarify the relationship between the circulatory flow velocity and the evaporation at the ejection port interface, in addition to the flow mode (the conditions of P, W, and H), the following regression equation of dimensionless numbers is used to form a simple prediction formula.

$$F_{ratio} = a1 \times (H^{-0.34}P^{-0.66}W)^{a2} \times \log(U_x/U_v)^{a3}$$

$F_{ratio}$: Ratio of initial viscosity to viscosity after concentration $U_x$: Flow velocity of liquid flowing through pressure chamber $U_v$: Evaporation speed in ejection port In the above feature, the second term on the right side is an index indicating the strength of the flow mode by a dimensionless number indicating the decision value J. The third term on the right side is an index indicating the strength of the circulatory flow by a dimensionless logarithmic ratio of the circulatory flow velocity to the evaporation speed at the ejection port interface. The left side is an index indicating the degree of concentration by a dimensionless ratio of the initial viscosity to the viscosity after concentration. Thus, the relational expression shows that the concentration ratio is proportional to the strength of the flow mode and the strength of the circulatory flow. Furthermore, a1, a2, and a3 were coefficients calculated by the least squares method, were calculated at levels described later, and a1=1.619, a2=−0.1569, and a3=−0.2560, as described below.

$$F_{ratio} = 1.619 \times (H^{-0.34}P^{-0.66}W)^{-0.1569} \times \log(U_x/U_v)^{-0.2560}$$

The prediction formula was defined in a numerical range of the following level.

Pressure chamber height H=14, 12, 9, 6, 4 μm (five levels)

Ejection port length P=11, 9, 6, 4 μm (four levels)

Temperature=25° C., 40° C., 55° C. (three levels)

Humidity=50% (one level)

Ejection port diameter=Φ16 (one level)

Circulatory flow velocity=1, 10, 30 mm/s (three levels)

The concentration ratio is calculated for the total of 180 levels. The range of the decision value J in these numerical ranges corresponds to 1.2 to 3.6, and the range of the ratio of circulatory flow velocity/evaporation speed corresponds to 4 to 1300 (0.65 to 3.09 in logarithmic expression). Non-logarithmic expression has a large difference from the typical range of the decision value J, and logarithmic expression provides each dimensionless number with a uniform weight. For an ink composed of two components of a volatile component (for example, water) and a nonvolatile component (for example, a solvent), numerical calculation was performed for evaporation, advection, and a diffusion phenomenon and was approximated by the regression line using the viscosity change rate from the initial stage with respect to the average value in the ejection port length P as a concentration ratio.

In general, the degree of the concentration ratio due to volatilization depends on the components of an ink composition and has a different result. However, the flow mode A has a circulatory flow in the ejection port length P and is slightly affected by the ink composition. In particular, as the decision value J increases in the flow mode A, the influence becomes extremely small. Thus, it is considered that a difference in component of the ink composition is negligible this time. Furthermore, a concentration phenomenon due to evaporation progresses with time, and it is therefore difficult to define a steady state. Due to a circulatory flow in the ejection port length P in the flow mode A, however, the concentration phenomenon progresses only in a partial region of an ejection port trench where advection is difficult. When the concentration ratio in the ejection port length P is assumed, however, the influence thereof is limited to a very small microscopic portion, and the steady state has been generally confirmed in consideration of a concentration phenomenon of seconds.

Several examples calculated as described above are compared (see FIG. 25).

Figure 25A:
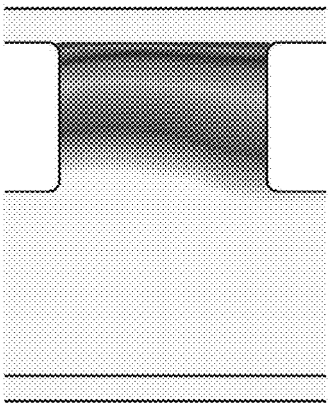
FIGS. 25A to 25E are views of the influence of the circulatory flow velocity.

1) H=14 μm, P=11 μm, temperature=40° C., $U_x$=1 mm/s, J=1.34, $F_{ratio}$=1.54 (FIG. 25A)

Figure 25B:
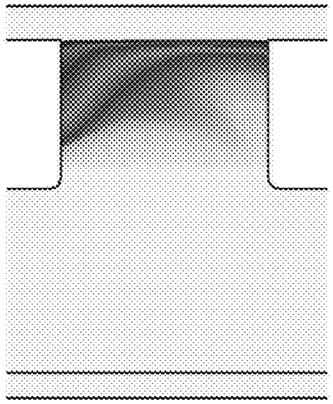

2) H=14 μm, P=11 μm, temperature=40° C., $U_x$=30 mm/s, J=1.34, $F_{ratio}$=1.22 (FIG. 25B)

Figure 25C:
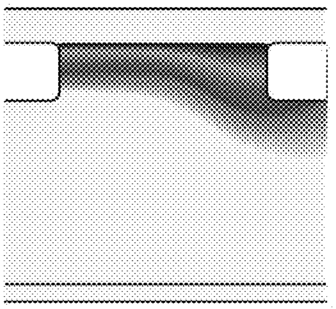

3) H=14 μm, P=4 μm, temperature=40° C., $U_x$=1 mm/s, J=2.61, $F_{ratio}$=1.38 (FIG. 25C)

Figure 25D:
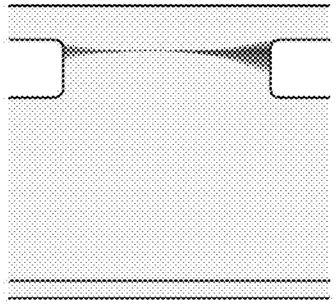

4) H=14 μm, P=4 μm, temperature=40° C., $U_x$=30 mm/s, J=2.61, $F_{ratio}$=1.10 (FIG. 25D)

Figure 25E:
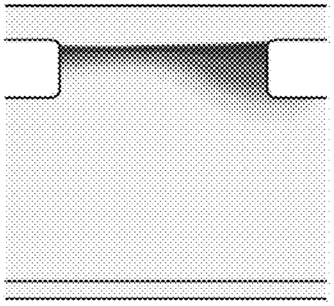

5) H=14 μm, P=4 μm, temperature=25° C., $U_x$=1 mm/s, J=2.61, $F_{ratio}$=1.23 (FIG. 25E)

FIGS. 25A and 25B show the influence of the circulatory flow velocity on the flow mode B. It can be seen that even increasing the circulatory flow velocity by 30 times has a small effect of reducing the concentration ratio because the circulatory flow does not easily flow to the ejection port interface in the flow mode B. On the other hand, FIGS. 25C and 25D show the influence of the circulatory flow velocity on the flow mode A. It can be seen that increasing the circulatory flow velocity by 30 times has a large effect of reducing the concentration ratio because the circulatory flow flows to the ejection port interface in the flow mode A. Although the circulatory flow velocity is increased in FIG. 25D, lowering the temperature as in FIG. 25E can decrease the evaporation speed, increase the ratio of the circulatory flow velocity to the evaporation speed even at a circulatory flow velocity of 1 mm/s, and enhance the effect of reducing the concentration ratio.

Figure 26:
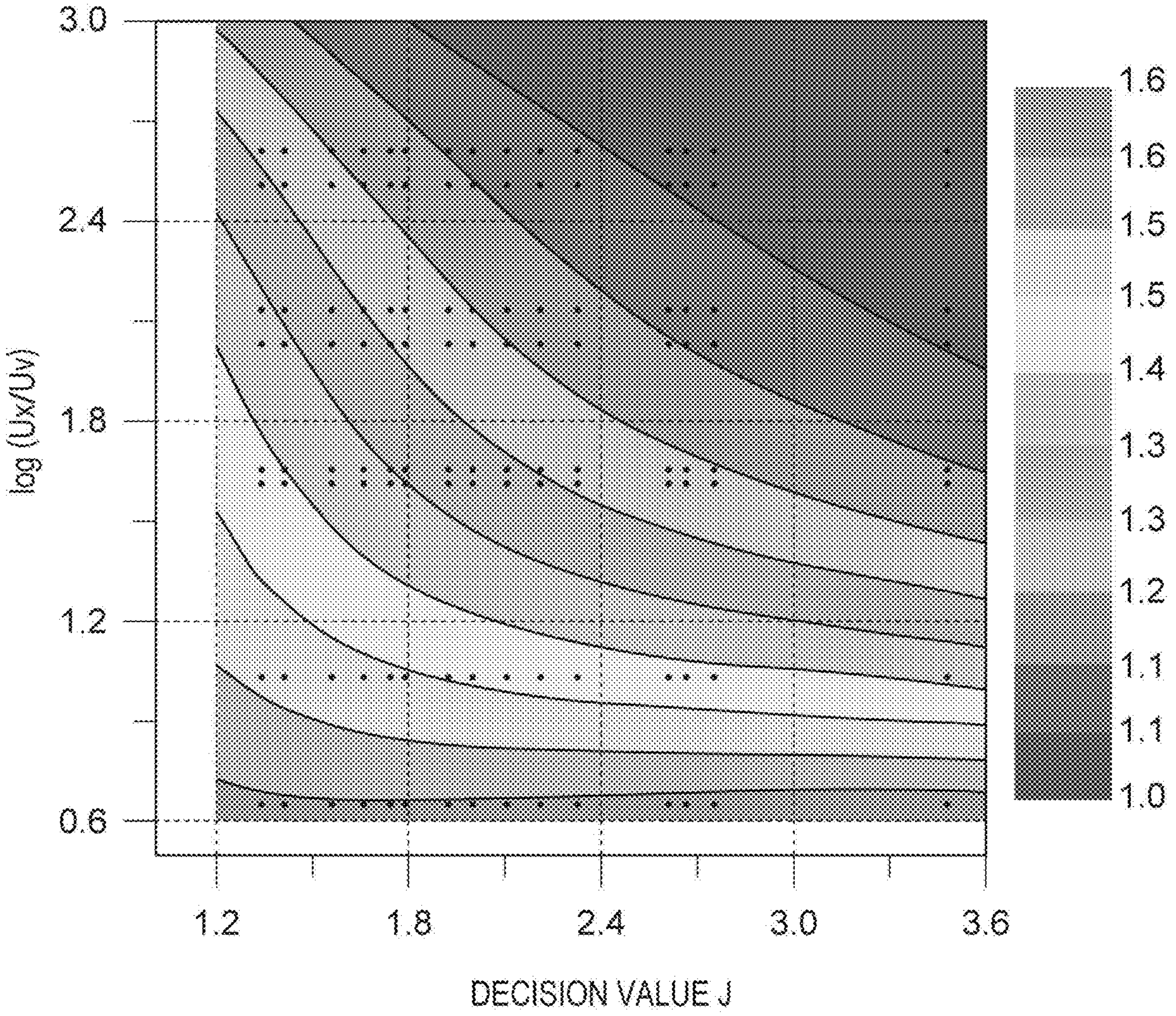
FIG. 26 is a contour plot for the concentration ratio.

FIG. 26 shows a response surface for these levels and is a contour plot with respect to the concentration ratio in which the horizontal axis represents the decision value J and the vertical axis represents the logarithmic ratio of circulatory flow velocity/evaporation speed. At a high decision value J, it is found that the concentration ratio is suppressed even at a low circulatory flow rate. This shows a large effect of increasing the flow rate in the flow mode A. Viewed from the opposite side, in the flow mode A, the concentration ratio can be reduced even at a low flow rate. In contrast, in the flow mode B, even increasing the flow rate has a small effect, and it is difficult to bring the concentration ratio close to the concentration ratio in the flow mode A. Thus, it is understood that it is difficult to reduce the pump flow rate while reducing the concentration ratio in the flow mode B. Thus, it is desirable that the decision value J be greater than 1.7. Even in a configuration with a decision value J of less than 1.7, however, the pump flow rate can be reduced by decreasing the evaporation speed, for example, by decreasing the temperature, increasing the humidity, increasing the ejection port diameter, or the like. Thus, the flow mode B can also be used.

To estimate the pump flow rate required this time, first, the decision value J can be calculated by determining the pressure chamber height H, the ejection port length P, and the ejection port diameter W. On the other hand, strictly speaking, the evaporation speed $U_v$ is desirably determined using a Fickian diffusion equation associated with diffusion, but may be calculated using the following formula, and a necessary circulatory flow velocity may be determined using a prediction formula.

$$Uv = arDln\left(\frac{P - Pa}{P - Ps}\right)/S$$

$U_v$: Evaporation speed per unit area [m/s]

a: Coefficient 0.0101 r: Radius [m] of ejection port (corresponding to W/2)

D: Diffusion coefficient [$m^2$/s]

S: Ejection port area [$m^2$]

P: Atmospheric pressure [Pa]

Ps: Saturated vapor pressure [Pa]

Pa: Water vapor pressure [Pa] in environment

Pa has the following relationship with Ps using the humidity H [%].

$$Pa = Ps\frac{H}{100}$$

In this formula, the evaporation speed $U_v$ can be simply calculated by determining the ejection port diameter W and the environment temperature/humidity used. Consequently, the circulatory flow velocity $U_x$ corresponding to the target concentration ratio $F_{ratio}$ can be determined.

Furthermore, when the flow velocity necessary for the ejection port can be calculated, the pump flow rate Q [$m^3$/s] is calculated using the following formula.

$$Q = U_x \times S \times N$$

S: Cross-sectional area [$m^2$]

N: Number of ejection ports [-]

The cross-sectional area S is the cross-sectional area of an upstream channel of the pressure chamber near the upstream side of a place where the pressure chamber and the ejection port portion communicate with each other, that is, the cross-sectional area corresponding to the pressure chamber height H.

It is possible to verify from the value of Q whether or not the pressure regulation mechanism required to realize the pump flow rate and the flow rate has a size and a numerical value suitable for the target, and it is possible to determine whether or not the size is allowable. Thus, for a plurality of ejection ports, $U_x$ [m/s] is represented by the following formula using the flow rate Q [$m^3$/s] of the pump, the cross-sectional area S [$m^2$], and the number N of the ejection ports.

$$U_x = Q/(S \times N)$$

In general, at a low solid density (when thickening during evaporation is small), the circulation effects can be obtained at a concentration ratio $F_{ratio}$ of 1.4 or less. However, at a high solid density (when thickening during evaporation is large), the concentration ratio $F_{ratio}$ can be 1.3 or less. Furthermore, for an ink liable to solidification in which the concentration phenomenon affects only a partial region of an ejection port trench, for example, for a latex ink or a high-concentration pigment ink with a reduced water content (water content≤60% by weight, pigment concentration ≥8% by weight), the concentration ratio $F_{ratio}$ can be 1.2 or less.

Thus, to suppress ink concentration due to the evaporation at the ejection port, in the same environment, the flow mode corresponds to the flow mode A with a decision value J of 1.7 or more, and the circulatory flow velocity can be decreased as the value increases. This reduces the size of a pump and a pressure regulation mechanism inside the head. This enables a downsizing design. On the other hand, when the decision value J is small in the flow mode A, the circulatory flow velocity should be increased. Thus, it is necessary to verify whether or not the pump and the pressure regulation mechanism are applicable. In some cases, increasing the decision value J by reconsidering the ejection configuration or decreasing the evaporation speed by reconsidering the temperature and the humidity is necessary to prevent an increase in the size of the pump. On the other hand, for a decision value J in the flow mode B, it can be seen that even increasing the circulatory flow velocity has a small effect of reducing the concentration ratio. In such a case, it is necessary to reduce the temperature, increase the humidity, increase the ejection port diameter, or the like to reduce the evaporation speed, thereby reducing the required circulatory flow velocity and reducing the pump flow rate.

<Pressure Regulation Unit>

Figures 7A, 7B, 7C:
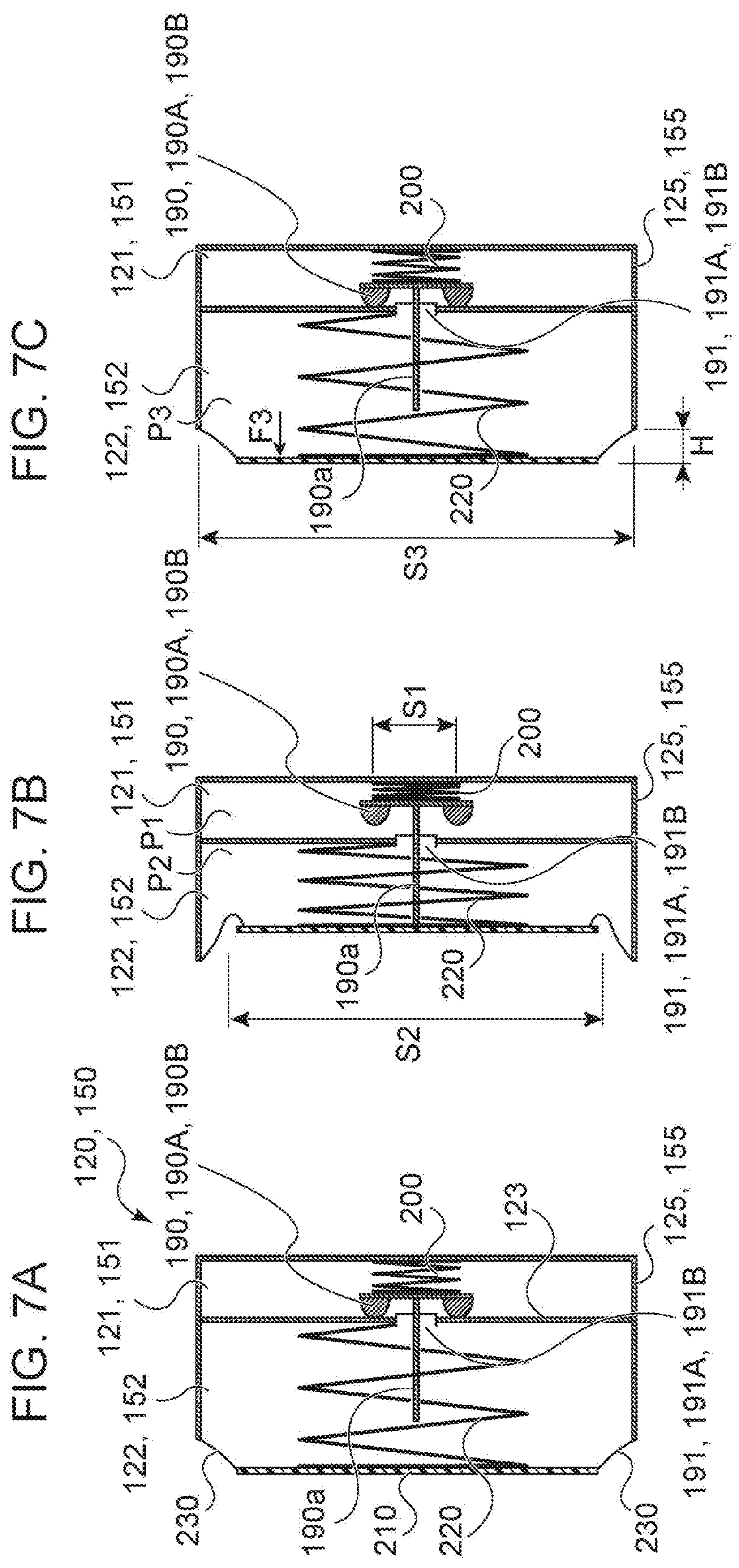
FIGS. 7A to 7C are cross-sectional views of an example of a pressure regulation unit.

FIGS. 7A to 7C illustrate examples of a pressure regulation unit. With reference to FIGS. 7A to 7C, the configuration and operation of pressure regulation units (the first pressure regulation unit 120 and the second pressure regulation unit 150) incorporated in the liquid ejection head 1 are described in more detail. The first pressure regulation unit 120 and the second pressure regulation unit 150 have substantially the same configuration. Thus, the first pressure regulation unit 120 is described below as an example, and only reference numerals and letters of portions corresponding to the first pressure regulation unit 120 in FIGS. 7A to 7C are described for the second pressure regulation unit 150. For the second pressure regulation unit 150, the first valve chamber 121 described below is read as the second valve chamber 151, and the first pressure control chamber 122 is read as the second pressure control chamber 152.

The first pressure regulation unit 120 includes the first valve chamber 121 and the first pressure control chamber 122 formed in a cylindrical housing 125. The first valve chamber 121 and the first pressure control chamber 122 are separated from each other by a partition 123 provided in the cylindrical housing 125. However, the first valve chamber 121 communicates with the first pressure control chamber 122 via a communication port 191 formed in the partition 123. The first valve chamber 121 includes a valve 190 that switches communication and isolation between the first valve chamber 121 and the first pressure control chamber 122 in the communication port 191. The valve 190 is held with a valve spring 200 at a position facing the communication port 191 and is configured to be brought into close contact with the partition 123 by the urging force of the valve spring 200. The valve 190 comes into close contact with the partition 123 and interrupts the ink flow in the communication port 191. To enhance the close contact with the partition 123, a contact portion of the valve 190 with the partition 123 can be formed of an elastic member. A valve shaft 190*a* to be inserted into the communication port 191 extends in the central portion of the valve 190. The valve shaft 190*a* can be pressed against the urging force of the valve spring 200 to separate the valve 190 from the partition 123 and transfer the ink through the communication port 191. The state in which the valve 190 interrupts the ink flow in the communication port 191 is hereinafter referred to as the “closed state”, and the state in which the ink can flow in the communication port 191 is hereinafter referred to as the “open state”.

The opening portion of the cylindrical housing 125 is closed with a flexible member 230 and a pressing plate 210. The first pressure control chamber 122 is formed by the flexible member 230, the pressing plate 210, the surrounding wall of the housing 125, and the partition 123. The pressing plate 210 is configured to be displaceable with the displacement of the flexible member 230. The pressing plate 210 and the flexible member 230 may be made of any material. For example, the pressing plate 210 may be constituted by a molded plastic component, and the flexible member 230 may be constituted by a resin film. In such a case, the pressing plate 210 can be fixed to the flexible member 230 by thermal welding.

A pressure-regulating spring 220 (urging member) is provided between the pressing plate 210 and the partition 123. As illustrated in FIG. 7A, the pressing plate 210 and the flexible member 230 are urged by the urging force of the pressure-regulating spring 220 in a direction in which the internal volume of the first pressure control chamber 122 increases. When the internal pressure of the first pressure control chamber 122 decreases, the pressing plate 210 and the flexible member 230 are displaced against the pressure of the pressure-regulating spring 220 in a direction in which the internal volume of the first pressure control chamber 122 decreases. When the internal volume of the first pressure control chamber 122 decreases to a certain amount, the pressing plate 210 abuts against the valve shaft 190*a* of the valve 190. Subsequently, when the internal volume of the first pressure control chamber 122 further decreases, the valve 190 moves together with the valve shaft 190*a* against the urging force of the valve spring 200 and separates from the partition 123. This results in the open state of the communication port 191 (the state in FIG. 7B).

In the present embodiment, in the open state of the communication port 191, the connection in the circulation path is configured such that the first valve chamber 121 has a higher pressure than the first pressure control chamber 122. Consequently, in the open state of the communication port 191, the ink flows from the first valve chamber 121 into the first pressure control chamber 122. The ink inflow displaces the flexible member 230 and the pressing plate 210 in a direction in which the internal volume of the first pressure control chamber 122 increases. Consequently, the pressing plate 210 separates from the valve shaft 190*a* of the valve 190, and the valve 190 comes into close contact with the partition 123 due to the urging force of the valve spring 200, thus resulting in the closed state of the communication port 191 (the state in FIG. 7C).

As described above, in the first pressure regulation unit 120 in the present embodiment, when the internal pressure of the first pressure control chamber 122 decreases to a certain pressure or less (for example, when the negative pressure is strengthened), the ink flows from the first valve chamber 121 through the communication port 191. Consequently, the pressure of the first pressure control chamber 122 is not further reduced. Thus, the first pressure control chamber 122 is controlled to have a pressure in a certain range.

Next, the pressure of the first pressure control chamber 122 is described in more detail.

The open state of the communication port 191 (the state in FIG. 7B) is described below in which the flexible member 230 and the pressing plate 210 are displaced in accordance with the pressure of the first pressure control chamber 122 as described above, and the pressing plate 210 abuts against the valve shaft 190*a*. In this state, the relationship between the forces acting on the pressing plate 210 is expressed by the following formula 1.

$$P2 \times S2 + F2 + (P1 - P2) \times S1 + F1 = 0 \quad \text{formula 1}$$

The formula 1 is transformed with respect to P2 into $$P2 = -(F1 + F2 + P1 \times S1)/(S2 - S1) \quad \text{formula 2}$$

P1: Pressure (gauge pressure) of first valve chamber 121

P2: Pressure (gauge pressure) of first pressure control chamber 122

F1: Spring force of valve spring 200

F2: spring force of pressure-regulating spring 220

S1: Pressure-receiving area of valve 190

S2: Pressure-receiving area of pressing plate 210

The direction in which the spring force F1 of the valve spring 200 and the spring force F2 of the pressure-regulating spring 220 push the valve 190 and the pressing plate 210 is defined as positive (the left direction in FIGS. 7A to 7C). The pressure P1 of the first valve chamber 121 and the pressure P2 of the first pressure control chamber 122 are configured to have the relationship of P1≥P2.

The pressure P2 of the first pressure control chamber 122 in the open state of the communication port 191 is determined using the formula 2. In the open state of the communication port 191, due to the relationship of P1≥P2, the ink flows from the first valve chamber 121 into the first pressure control chamber 122. Consequently, the pressure P2 of the first pressure control chamber 122 is not further reduced and is maintained in a certain range.

On the other hand, as illustrated in FIG. 7C, when the pressing plate 210 does not abut against the valve shaft 190*a* and the communication port 191 is in the closed state, the relationship between the forces acting on the pressing plate 210 is expressed by the formula 3.

$$P3 \times S3 + F3 = 0 \quad \text{formula 3}$$

The formula 3 is transformed with respect to P3 into $$P3 = -F3/S3 \quad \text{formula 4}$$

F3: Spring force of pressure-regulating spring 220 when pressing plate 210 does not abut against valve shaft 190*a*

P3: Pressure (gauge pressure) of first pressure control chamber 122 when pressing plate 210 does not abut against valve shaft 190*a*

S3: Pressure-receiving area of pressing plate 210 when pressing plate 210 does not abut against valve 190

FIG. 7C illustrates the pressing plate 210 and the flexible member 230 displaced leftward to the displaceable limit. The pressure P3 of the first pressure control chamber 122, the spring force F3 of the pressure-regulating spring 220, and the pressure-receiving area S3 of the pressing plate 210 change with the amount of displacement of the pressing plate 210 and the flexible member 230 in FIG. 7C. More specifically, when the pressing plate 210 and the flexible member 230 are located on the right side in FIG. 7C, the pressing plate 210 has a smaller pressure-receiving area S3, and the pressure-regulating spring 220 has a larger spring force F3. Consequently, the pressure P3 of the first pressure control chamber 122 decreases in accordance with the relationship of the formula 4. Thus, according to the formulae 2 and 4, the pressure of the first pressure control chamber 122 increases gradually (that is, the negative pressure is strengthened to a value approaching the positive pressure side) during the transition from the state of FIG. 7B to the state of FIG. 7C. Thus, from the open state of the communication port 191, the pressing plate 210 and the flexible member 230 are gradually displaced leftward, and the pressure of the first pressure control chamber 122 increases gradually until the internal volume of the first pressure control chamber 122 finally reaches the displaceable limit. Thus, the negative pressure is strengthened.

<Circulating Pump>

Figure 8A:
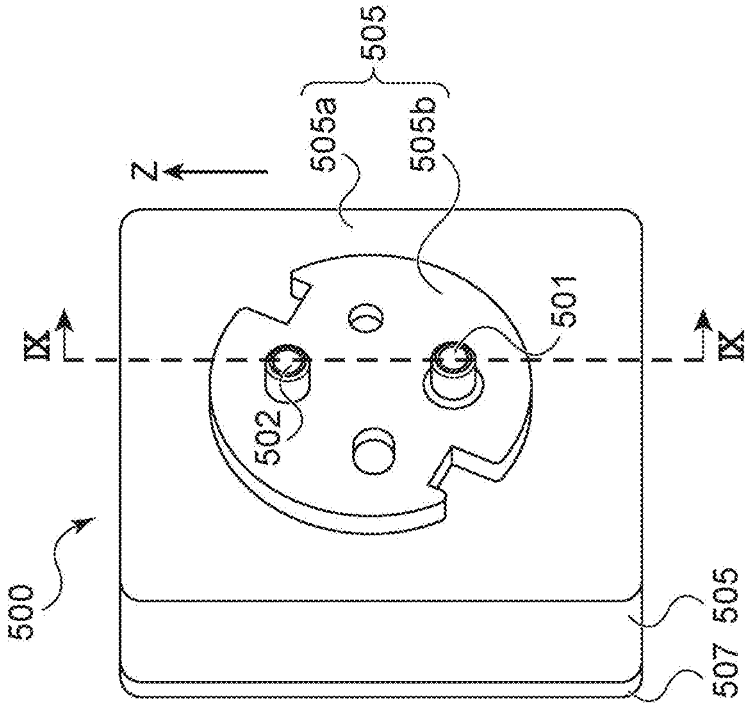
FIGS. 8A and 8B are external perspective views of a circulating pump.
Figure 8B:
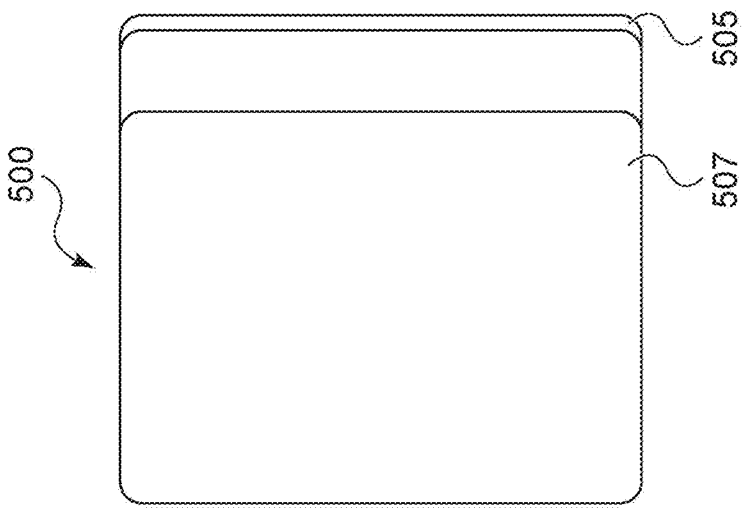
Figure 9:
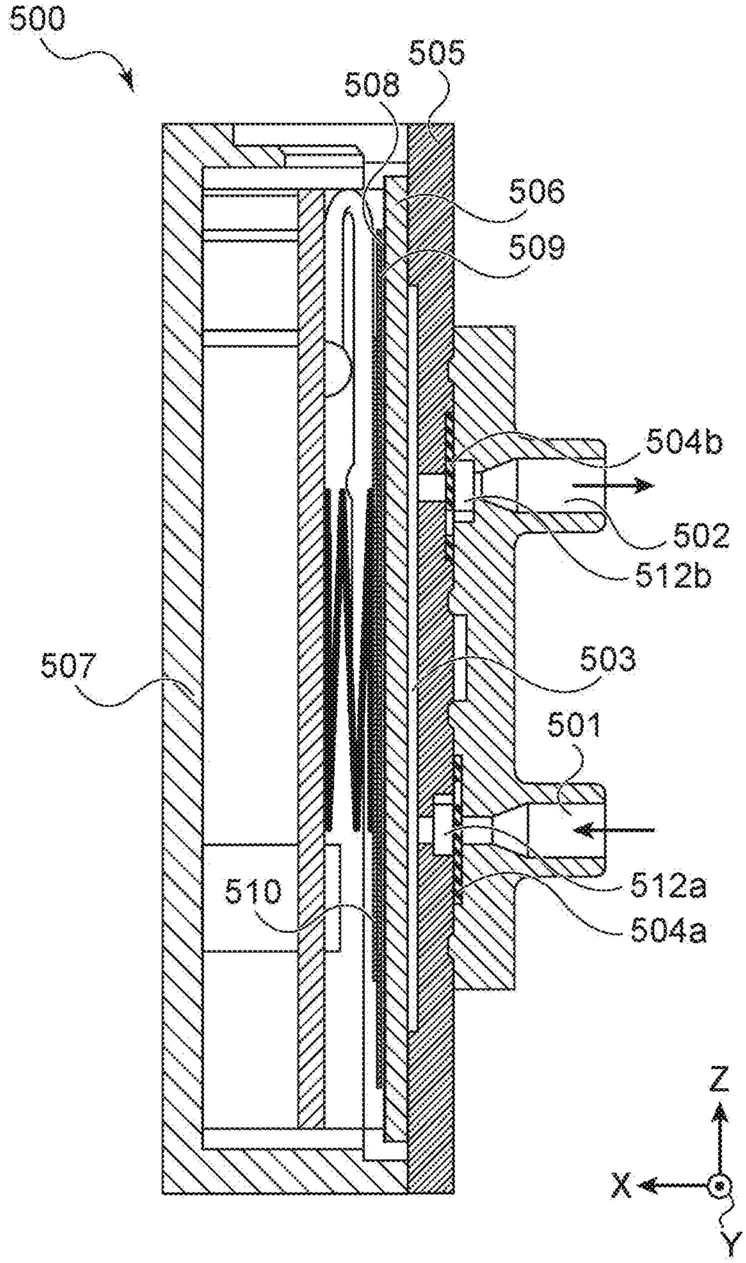
FIG. 9 is a cross-sectional view taken along the line IX-IX of the circulating pump illustrated in FIG. 8A.

Next, with reference to FIGS. 8A and 8B and FIG. 9, the configuration and operation of the circulating pump 500 incorporated in the liquid ejection head 1 are described in detail.

FIGS. 8A and 8B are external perspective views of the circulating pump 500. FIG. 8A is an external perspective view of the front side of the circulating pump 500, and FIG. 8B is an external perspective view of the back side of the circulating pump 500. The outer shell of the circulating pump 500 is composed of a pump housing 505 and a cover 507 fixed to the pump housing 505. The pump housing 505 is composed of a housing main body 505*a* and a channel-connecting member 505*b* attached and fixed to the outer surface of the housing main body 505*a*. Each of the housing main body 505*a* and the channel-connecting member 505*b* has a pair of through-holes communicating with each other at two different positions. A pair of through-holes at one position forms a pump supply hole 501, and a pair of through-holes at the other position forms a pump discharge hole 502. The pump supply hole 501 is connected to the pump inlet channel 170 connected to the second pressure control chamber 152, and the pump discharge hole 502 is connected to the pump outlet channel 180 connected to the first pressure control chamber 122. The ink supplied from the pump supply hole 501 passes through a pump chamber 503 described later (see FIG. 9) and is discharged from the pump discharge hole 502.

FIG. 9 is a cross-sectional view taken along the line IX-IX of the circulating pump 500 illustrated in FIG. 8A. A diaphragm 506 is bonded to the inner surface of the pump housing 505, and the pump chamber 503 is formed between the diaphragm 506 and a recessed portion formed in the inner surface of the pump housing 505. The pump chamber 503 communicates with the pump supply hole 501 and the pump discharge hole 502 formed in the pump housing 505. A check valve 504*a* is provided in an intermediate portion of the pump supply hole 501, and a check valve 504*b* is provided in an intermediate portion of the pump discharge hole 502.

More specifically, the check valve 504*a* is disposed such that a portion thereof can move leftward in the drawing in a space 512*a* formed in the intermediate portion of the pump supply hole 501. The check valve 504*b* is disposed such that a portion thereof can move rightward in the drawing in a space 512*b* formed in the intermediate portion of the pump discharge hole 502.

When the diaphragm 506 is displaced to increase the volume of the pump chamber 503 and depressurize the pump chamber 503, the check valve 504*a* separates from the opening of the pump supply hole 501 in the space 512*a* (that is, moves leftward in the drawing). When the check valve 504*a* separates from the opening of the pump supply hole 501 in the space 512*a*, the ink can flow through the pump supply hole 501 in the open state. When the diaphragm 506 is displaced to reduce the volume of the pump chamber 503 and pressurize the pump chamber 503, the check valve 504*a* comes into close contact with the wall around the opening of the pump supply hole 501. Consequently, the ink flow through the pump supply hole 501 is interrupted in the closed state.

On the other hand, when the pump chamber 503 is depressurized, the check valve 504*b* comes into close contact with the wall around the opening of the pump housing 505, and the ink flow in the pump discharge hole 502 is interrupted in the closed state. When the pump chamber 503 is pressurized, the check valve 504*b* separates from the opening of the pump housing 505 and moves toward the space 512*b* (that is, moves rightward in the drawing), thereby allowing the ink to flow through the pump discharge hole 502.

The check valves 504*a* and 504*b* may be made of any material that is deformable in accordance with the internal pressure of the pump chamber 503, and may be made of, for example, an elastic member, such as EPDM or an elastomer, a polypropylene film or sheet, or the like. However, the present disclosure is not limited thereto.

As described above, the pump chamber 503 is formed by bonding the pump housing 505 and the diaphragm 506 together. Thus, the deformation of the diaphragm 506 changes the pressure of the pump chamber 503. For example, the diaphragm 506 displaced to the pump housing 505 side (displaced rightward in the drawing) decreases the volume of the pump chamber 503 and increases the internal pressure of the pump chamber 503. This opens the check valve 504*b* facing the pump discharge hole 502, and the ink is discharged from the pump chamber 503. At this time, the check valve 504*a* facing the pump supply hole 501 is in close contact with the wall around the pump supply hole 501 and suppresses the ink backflow from the pump chamber 503 to the pump supply hole 501.

In contrast, the diaphragm 506 displaced in a direction in which the pump chamber 503 is expanded reduces the pressure of the pump chamber 503. This opens the check valve 504*a* facing the pump supply hole 501, and the ink is supplied to the pump chamber 503. At this time, the check valve 504*b* in the pump discharge hole 502 comes into close contact with the wall around the opening formed in the pump housing 505 and closes the opening. This suppresses the ink backflow from the pump discharge hole 502 to the pump chamber 503.

Thus, in the circulating pump 500, the diaphragm 506 is deformed to change the internal pressure of the pump chamber 503, thereby sucking and discharging the ink. At this time, if bubbles are mixed into the pump chamber 503, even if the diaphragm 506 is displaced, expansion and contraction of the bubbles reduces a change in the internal pressure of the pump chamber 503 and reduces the liquid feed rate. Thus, the pump chamber 503 is arranged in parallel to the gravity so that bubbles mixed into the pump chamber 503 are easily collected in the upper portion of the pump chamber 503, and the pump discharge hole 502 is arranged above the center of the pump chamber 503. This can improve the discharge performance of bubbles in the pump and stabilize the flow rate.

<Ink Flow in Liquid Ejection Head>

Figures 10A, 10B, 10C, 10D, 10E:
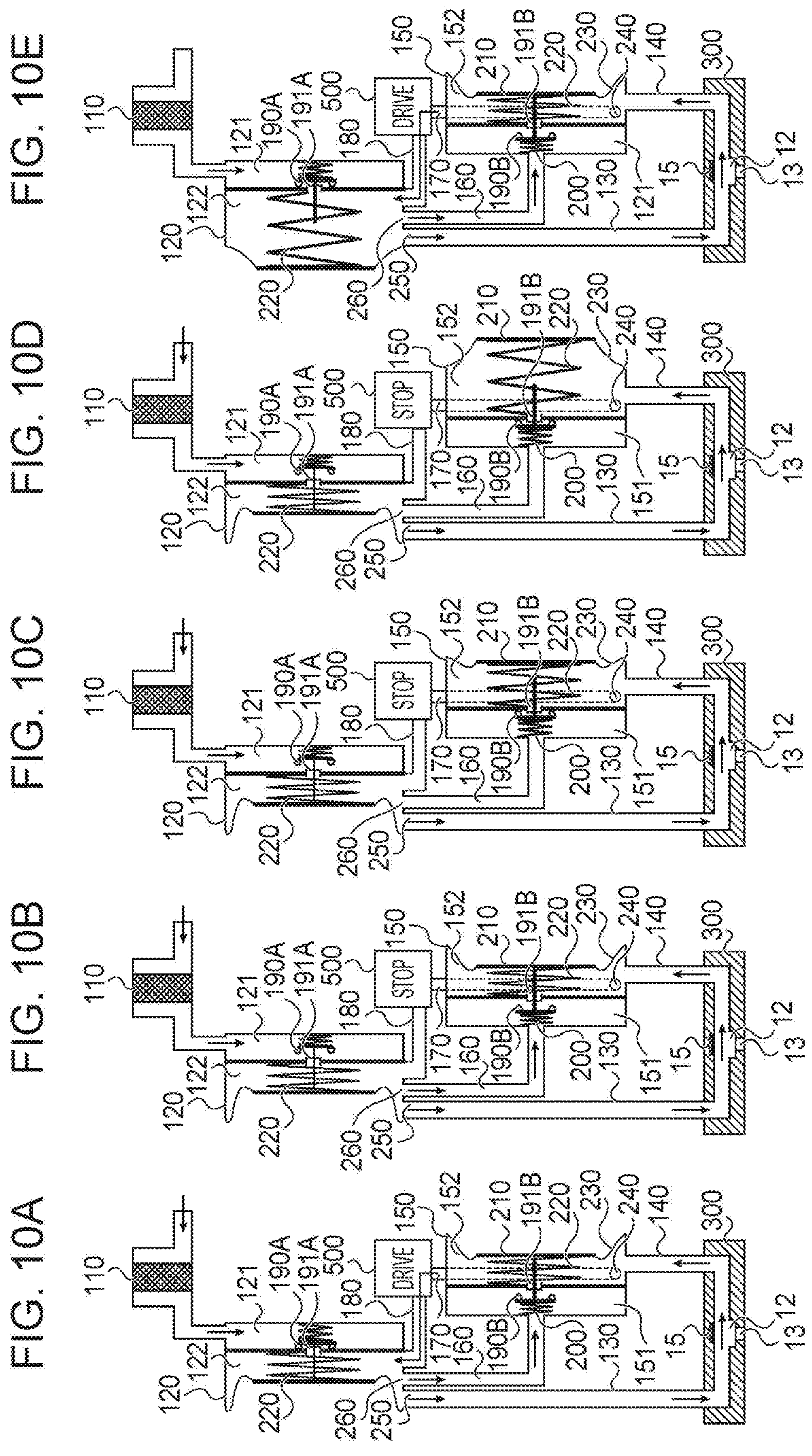
FIGS. 10A to 10E are explanatory views of an ink flow in a liquid ejection head.

FIGS. 10A to 10E are explanatory views of the ink flow in a liquid ejection head. The ink circulation in the liquid ejection head 1 is described below with reference to FIGS. 10A to 10E. To more clearly describe the ink circulation path, the relative position of each configuration (the first pressure regulation unit 120, the second pressure regulation unit 150, the circulating pump 500, or the like) in FIGS. 10A to 10E is simplified. Thus, each configuration has a different relative position from the configuration of FIG. 19 described later. FIG. 10A schematically illustrates the ink flow during recording operation of ejecting ink from the ejection port 13. The arrows in the drawings indicate the ink flow. In the present embodiment, for the recording operation, both the external pump 21 and the circulating pump 500 start to be driven. The external pump 21 and the circulating pump 500 may be driven regardless of the recording operation. The external pump 21 and the circulating pump 500 are not necessarily driven in conjunction with each other and may be driven separately and independently.

During the recording operation, the circulating pump 500 is in an ON state (drive state), and the ink flowed out from the first pressure control chamber 122 flows into the supply channel 130 and the bypass 160. The ink flowed into the supply channel 130 passes through the ejection module 300, flows into the collecting channel 140, and is then supplied to the second pressure control chamber 152.

On the other hand, the ink flowed from the first pressure control chamber 122 into the bypass 160 flows into the second pressure control chamber 152 through the second valve chamber 151. The ink flowed into the second pressure control chamber 152 passes through the pump inlet channel 170, the circulating pump 500, and the pump outlet channel 180, and then flows into the first pressure control chamber 122 again. At this time, the control pressure by the first valve chamber 121 is set to be higher than the control pressure of the first pressure control chamber 122 on the basis of the relationship of the formula 2. Thus, the ink in the first pressure control chamber 122 is supplied to the ejection module 300 again through the supply channel 130 without flowing to the first valve chamber 121. The ink flowed into the ejection module 300 flows into the first pressure control chamber 122 again through the collecting channel 140, the second pressure control chamber 152, the pump inlet channel 170, the circulating pump 500, and the pump outlet channel 180. In this way, ink circulation is completed in the liquid ejection head 1.

In the ink circulation, the circulation volume (flow rate) of the ink in the ejection module 300 depends on the difference in control pressure between the first pressure control chamber 122 and the second pressure control chamber 152. The differential pressure is determined such that thickening of the ink near the ejection port in the ejection module 300 can be suppressed at the circulation volume. The ink consumed by recording is supplied from the ink tank 2 to the first pressure control chamber 122 through the filter 110 and the first valve chamber 121. A mechanism for supplying the consumed ink is described in detail below. A decrease in the amount of ink in the circulation path consumed by recording results in a decrease in the internal pressure of the first pressure control chamber 122 and also a decrease in the amount of ink in the first pressure control chamber 122. A decrease in the amount of ink in the first pressure control chamber 122 results in a decrease in the internal volume of the first pressure control chamber 122. Due to the decrease in the internal volume of the first pressure control chamber 122, the communication port 191A is opened, and ink is supplied from the first valve chamber 121 to the first pressure control chamber 122. The supplied ink passing through the communication port 191A from the first valve chamber 121 causes a pressure drop, and the ink flowed into the first pressure control chamber 122 switches the positive pressure to a negative pressure. The ink flowed from the first valve chamber 121 into the first pressure control chamber 122 increases the internal pressure of the first pressure control chamber 122 and consequently the internal volume of the first pressure control chamber 122, thereby closing the communication port 191A. In this way, the communication port 191A repeats the open state and the closed state in accordance with the consumption of ink. When ink is not consumed, the communication port 191A is maintained in the closed state.

FIG. 10B schematically illustrates the ink flow immediately after the recording operation is completed and the circulating pump 500 is turned off (in the stop state). When the recording operation is completed and the circulating pump 500 is turned off, both the pressure of the first pressure control chamber 122 and the pressure of the second pressure control chamber 152 are the control pressure during the recording operation. Thus, the ink moves as illustrated in FIG. 10B in accordance with the differential pressure between the pressure of the first pressure control chamber 122 and the pressure of the second pressure control chamber 152. More specifically, the ink is supplied from the first pressure control chamber 122 to the ejection module 300 through the supply channel 130 and then flows to the second pressure control chamber 152 through the collecting channel 140. Subsequently, the ink flows from the first pressure control chamber 122 to the second pressure control chamber 152 through the bypass 160 and the second valve chamber 151.

The amount of ink moved from the first pressure control chamber 122 to the second pressure control chamber 152 by these ink flows is supplied from the ink tank 2 to the first pressure control chamber 122 through the filter 110 and the first valve chamber 121. Thus, the interior content of the first pressure control chamber 122 is kept constant. When the interior content of the first pressure control chamber 122 is constant, the spring force F1 of the valve spring 200, the spring force F2 of the pressure-regulating spring 220, the pressure-receiving area S1 of the valve 190, and the pressure-receiving area S2 of the pressing plate 210 are kept constant in accordance with the formula 2. Thus, the pressure of the first pressure control chamber 122 depends on a change in the pressure (gauge pressure) P1 of the first valve chamber 121. Thus, when the pressure P1 of the first valve chamber 121 is not changed, the pressure P2 of the first pressure control chamber 122 is maintained at the same level as the control pressure during the recording operation.

On the other hand, the pressure of the second pressure control chamber 152 changes over time in accordance with the change in the interior content accompanying the ink inflow from the first pressure control chamber 122. More specifically, from the state illustrated in FIG. 10B to the state illustrated in FIG. 10C in which the communication port 191 is closed and the second valve chamber 151 and the second pressure control chamber 152 are not in communication with each other, the pressure of the second pressure control chamber 152 changes in accordance with the formula 2. The pressing plate 210 and the valve shaft 190*a* are then brought into a non-contact state, and the communication port 191 is brought into the closed state. As illustrated in FIG. 10D, the ink then flows from the collecting channel 140 into the second pressure control chamber 152. The pressing plate 210 and the flexible member 230 are displaced by the ink inflow, and the pressure of the second pressure control chamber 152 changes in accordance with the formula 4 until the internal volume of the second pressure control chamber 152 reaches the maximum. Thus, it increases.

In the state of FIG. 10C, the ink does not flow from the first pressure control chamber 122 to the second pressure control chamber 152 through the bypass 160 and the second valve chamber 151. Thus, the ink in the first pressure control chamber 122 supplied to the ejection module 300 through the supply channel 130 flows only to the second pressure control chamber 152 through the collecting channel 140. As described above, the movement of the ink from the first pressure control chamber 122 to the second pressure control chamber 152 occurs in accordance with the differential pressure between the internal pressure of the first pressure control chamber 122 and the internal pressure of the second pressure control chamber 152. Thus, when the second pressure control chamber 152 has the same internal pressure as the first pressure control chamber 122, the movement of the ink is stopped.

In a state where the second pressure control chamber 152 has the same internal pressure as the first pressure control chamber 122, the second pressure control chamber 152 expands to the state illustrated in FIG. 10D. When the second pressure control chamber 152 is expanded as illustrated in FIG. 10D, a reservoir portion capable of storing ink is formed in the second pressure control chamber 152. The transition time from the stop of the circulating pump 500 to the state of FIG. 10D may vary with the shape and size of channel and the properties of ink and ranges from approximately 1 to 2 minutes. When the circulating pump 500 is driven from the state illustrated in FIG. 10D in which ink is stored in the reservoir portion, the circulating pump 500 supplies the ink from the reservoir portion to the first pressure control chamber 122. As illustrated in FIG. 10E, this increases the amount of ink in the first pressure control chamber 122 and displaces the flexible member 230 and the pressing plate 210 in the expanding direction. When the circulating pump 500 continues to be driven, the state in the circulation path changes as illustrated in FIG. 10A.

In the above description, although FIG. 10A describes an example in the recording operation, the ink may be circulated without the recording operation as described above. Even in such a case, the ink flows as illustrated in FIGS. 10A to 10E in accordance with the driving and stopping of the circulating pump 500.

As described above, in the present embodiment, the communication port 191B in the second pressure regulation unit 150 is in the open state when the circulating pump 500 is driven for ink circulation and is in the closed state when the ink circulation is stopped. However, the present disclosure is not limited thereto. The control pressure may be set such that the communication port 191B in the second pressure regulation unit 150 is in the closed state even when the circulating pump 500 is driven for ink circulation. This is more specifically described together with the function of the bypass 160.

The bypass 160, which connects the first pressure regulation unit 120 and the second pressure regulation unit 150, is provided, for example, so that a negative pressure stronger than a predetermined value in the circulation path has no influence on the ejection module 300. The bypass 160 is also provided to supply ink from both sides of the supply channel 130 and the collecting channel 140 to the pressure chamber 12.

First, an example is described in which the bypass 160 is provided so that a negative pressure stronger than a predetermined value has no influence on the ejection module 300. For example, a change in the environment temperature may change the characteristics (for example, viscosity) of ink. A change in the viscosity of ink also changes the pressure drop in the circulation path. For example, a decrease in the viscosity of ink results in a decrease in the pressure drop in the circulation path. This increases the flow rate of the circulating pump 500 driven at a constant driving amount and increases the flow rate through the ejection module 300. On the other hand, the ejection module 300 is maintained at a constant temperature by a temperature regulating mechanism (not shown), and the ink in the ejection module 300 therefore has a constant viscosity even at different environment temperatures. While the viscosity of the ink in the ejection module 300 does not change, an increase in the flow rate of the ink flowing through the ejection module 300 strengthens the negative pressure in the ejection module 300 due to flow resistance. Thus, a negative pressure stronger than a predetermined value in the ejection module 300 may break the meniscus in the ejection port 13, bring the outside air into the circulation path, and prevent normal ejection. Even when the meniscus is not broken, a negative pressure stronger than a predetermined value in the pressure chamber 12 may affect the ejection.

Thus, in the present embodiment, the bypass 160 is formed in the circulation path. In the presence of the bypass 160, when the negative pressure is stronger than a predetermined value, ink also flows through the bypass 160, and the pressure of the ejection module 300 can be kept constant. Thus, for example, the communication port 191B in the second pressure regulation unit 150 may have such a control pressure that can maintain the closed state even while the circulating pump 500 is driven. Furthermore, the control pressure of the second pressure regulation unit may be set such that the communication port 191 in the second pressure regulation unit 150 is in the open state at a negative pressure stronger than a predetermined value. Thus, provided that the meniscus is not broken or a predetermined negative pressure is maintained even when a change in viscosity due to an environmental change or the like changes the flow rate of the pump, the communication port 191B may be in the closed state when the circulating pump 500 is driven.

In the next example, the bypass 160 is provided to supply ink to the pressure chamber 12 from both sides of the supply channel 130 and the collecting channel 140. A pressure fluctuation in the circulation path can also be caused by the ejection operation of the ejection element 15. This is because the ejection operation generates a force for drawing ink into the pressure chamber.

Ink supply to the pressure chamber 12 on both sides of the supply channel 130 and the collecting channel 140 during continuous high-duty recording is described below. Although the definition of duty may depend on various conditions, it is assumed here that 4 pl of one ink droplet recorded on a 1200 dpi grid is 100%. High-duty recording is, for example, recording with a duty of 100%.

Continuous high-duty recording decreases the amount of ink flowing from the pressure chamber 12 into the second pressure control chamber 152 through the collecting channel 140. On the other hand, the circulating pump 500 performs ink outflow at a constant amount. This disrupts the balance between inflow and outflow in the second pressure control chamber 152, decreases the amount of ink in the second pressure control chamber 152, lowers the negative internal pressure of the second pressure control chamber 152, and contracts the second pressure control chamber 152. A lower negative internal pressure of the second pressure control chamber 152 increases the ink inflow into the second pressure control chamber 152 through the bypass 160 and stabilizes the second pressure control chamber 152 with balanced outflow and inflow. In this way, as a result, the negative internal pressure of the second pressure control chamber 152 decreases in accordance with the duty. Furthermore, as described above, in the closed state of the communication port 191B while the circulating pump 500 is driven, the communication port 191B is in the open state according to the duty, and the ink flows from the bypass 160 into the second pressure control chamber 152.

Continuous high-duty recording decreases the amount of ink flowing from the pressure chamber 12 into the second pressure control chamber 152 through the collecting channel 140 and, instead, increases the amount of ink flowing from the communication port 191B into the second pressure control chamber 152 through the bypass 160. When this state further progresses, the amount of ink flowing from the pressure chamber 12 into the second pressure control chamber 152 through the collecting channel 140 becomes zero, and all the ink flowing out to the circulating pump 500 is the ink flowing from the communication port 191B. When this state further progresses, the ink backs up from the second pressure control chamber 152 to the pressure chamber 12 through the collecting channel 140. In this state, the ink flowing out from the second pressure control chamber 152 to the circulating pump 500 and the ink flowing out to the pressure chamber 12 flow into the second pressure control chamber 152 from the communication port 191B through the bypass 160. In this case, the ink of the supply channel 130 and the ink of the collecting channel 140 fill the pressure chamber 12 and are ejected.

The ink backflow at a high recording duty is a phenomenon due to the bypass 160. Although the communication port 191B in the second pressure regulation unit enters the open state in response to the ink backflow in the above example, the ink backflow may occur in the open state of the communication port 191B in the second pressure regulation unit. Even without the second pressure regulation unit, the bypass 160 may cause the ink backflow.

<Configuration of Ejection Unit>

Figure 11A:
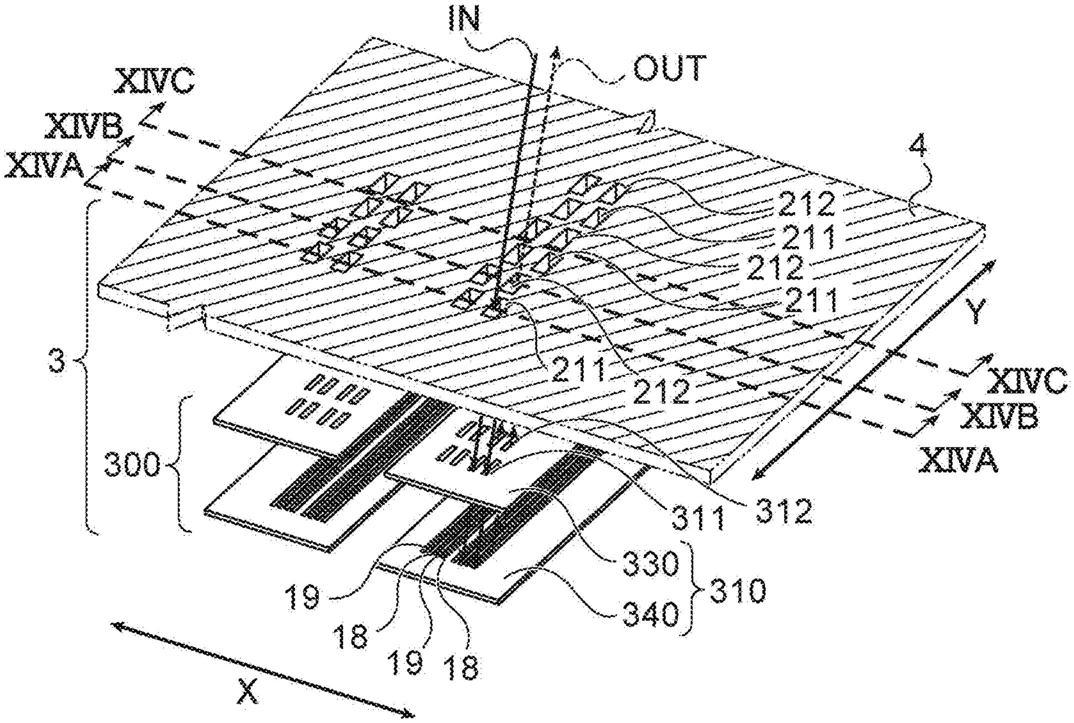
FIGS. 11A and 11B are schematic views of a circulation path in an ejection unit.
Figure 11B:
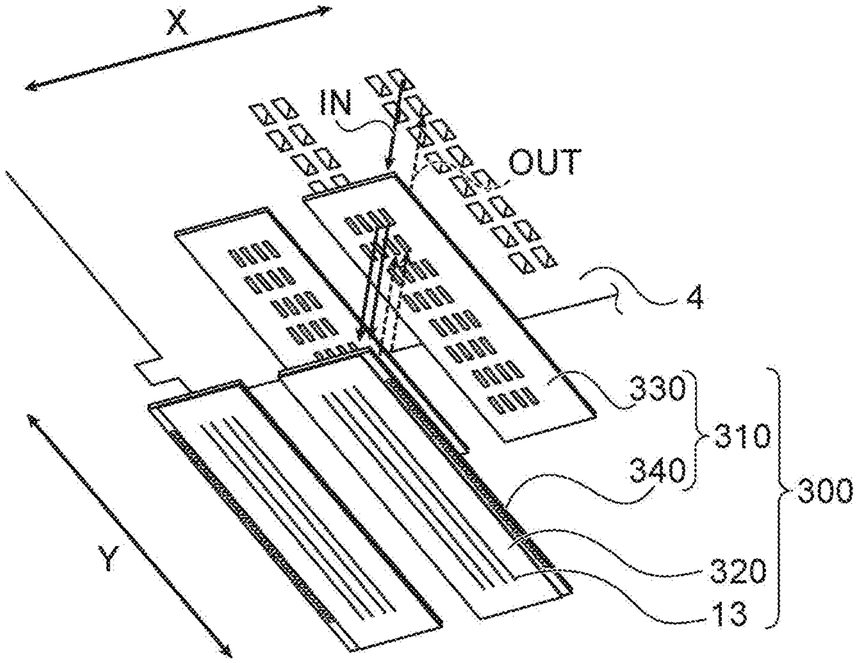
Figure 12:
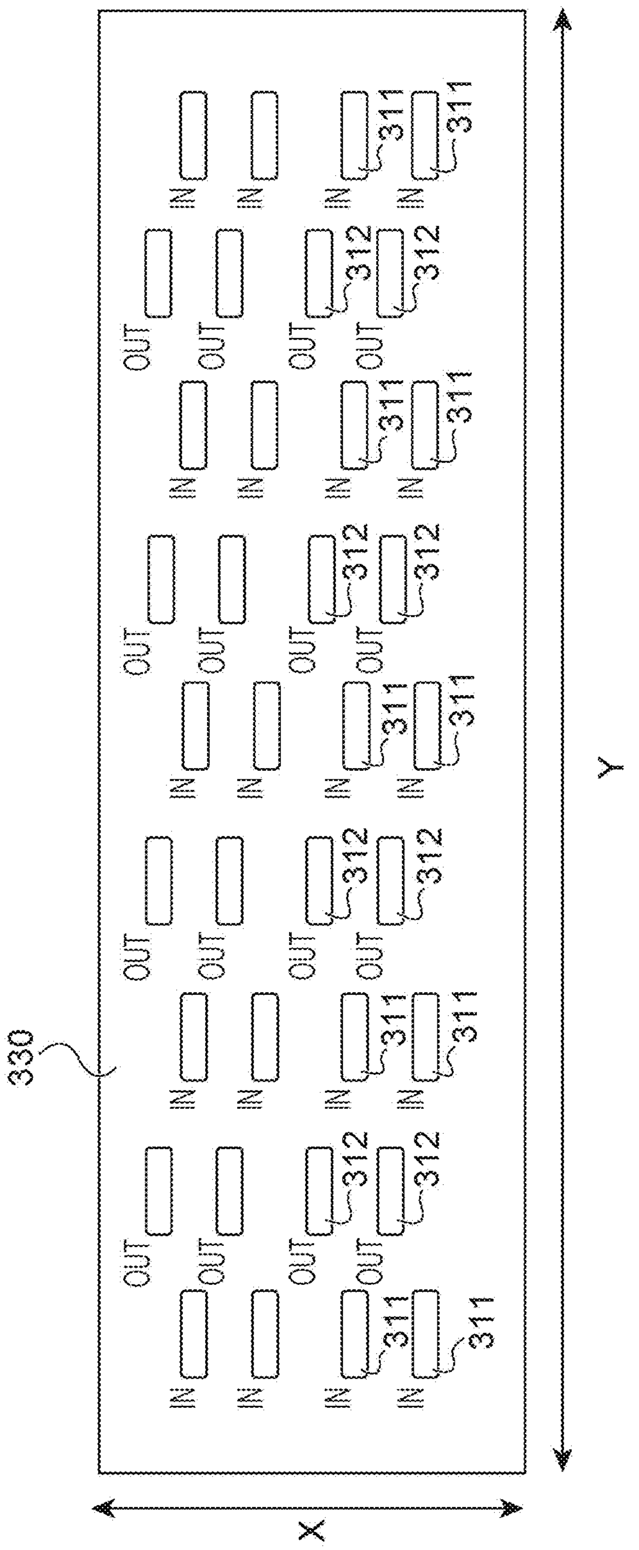
FIG. 12 is a view of an opening plate.
Figure 13:
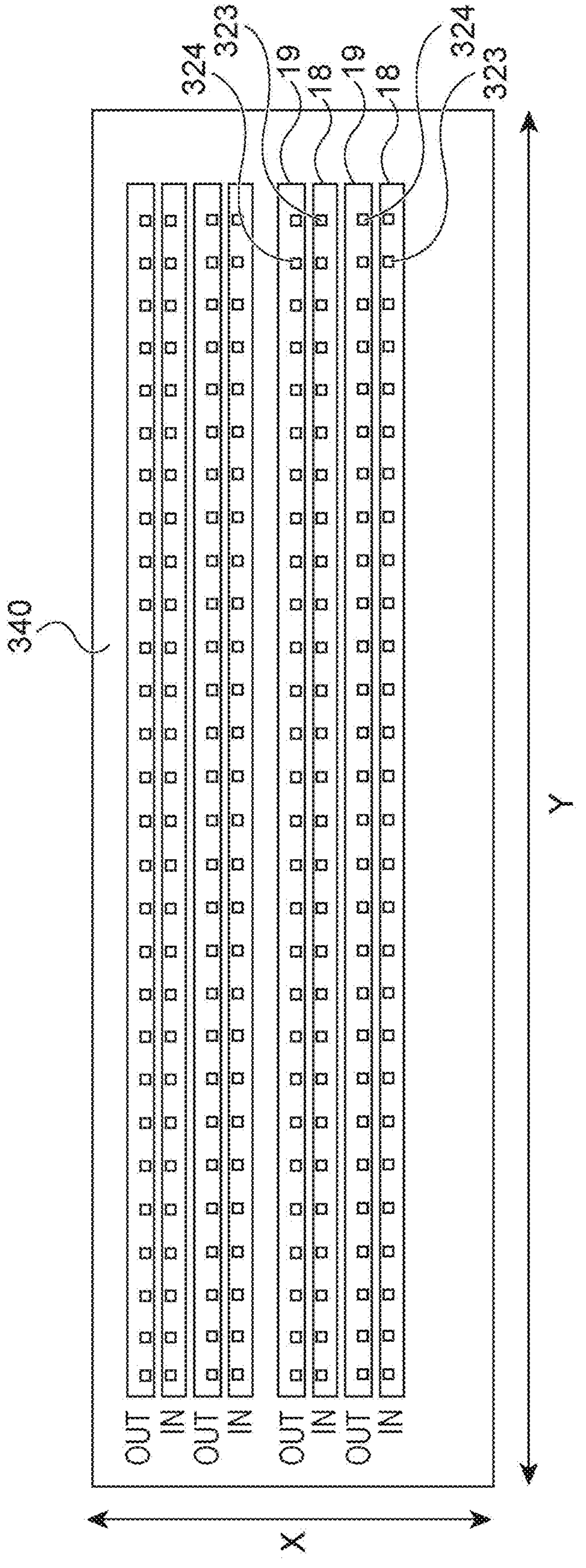
FIG. 13 is a view of an ejection element substrate.

FIGS. 11A and 11B are schematic views of a circulation path for one color of ink in the ejection unit 3 of the present embodiment. FIG. 11A is an exploded perspective view of the ejection unit 3 viewed from the first supporting member 4 side, and FIG. 11B is an exploded perspective view of the ejection unit 3 viewed from the ejection module 300 side. The arrows indicated by IN and OUT in the drawing indicate the ink flow. Although the ink flow is described only for one color, another color also has the same flow. Furthermore, FIGS. 11A and 11B do not illustrate the second supporting member 7 and the electric wiring member 5 and also do not illustrate the configuration of the ejection unit. FIG. 11A shows a cross section of the first supporting member 4 taken along the line XIA-XIA of FIG. 3A. The ejection module 300 includes an ejection element substrate 340 and an opening plate 330. FIG. 12 is a view of the opening plate 330. FIG. 13 is a view of the ejection element substrate 340.

Ink is supplied from the circulation unit 54 to the ejection unit 3 through the joint member 8 (see FIG. 3). A path of the ink after passing through the joint member 8 and returning to the joint member 8 is described below. In the following drawings, the joint member 8 is not illustrated.

The ejection module 300 includes the ejection element substrate 340 and the opening plate 330, which constitute the silicon substrate 310, and the ejection-port-forming member 320. The ejection element substrate 340, the opening plate 330, and the ejection-port-forming member 320 are stacked and bonded to each other such that the channel of each ink communicates with each other to constitute the ejection module 300, and are supported by the first supporting member 4. The ejection module 300 is supported by the first supporting member 4 and constitutes the ejection unit 3. The ejection element substrate 340 includes the ejection-port-forming member 320. The ejection-port-forming member 320 includes a plurality of ejection port arrays each composed of a plurality of ejection ports 13 and ejects part of the ink supplied through the ink channel in the ejection module 300 from the ejection ports 13. The ink that has not been ejected is collected through an ink channel in the ejection module 300.

As illustrated in FIGS. 11A and 11B and FIG. 12, the opening plate 330 includes a plurality of arranged ink supply ports 311 and a plurality of arranged ink collection ports 312. As illustrated in FIG. 13 and FIGS. 14A to 14C, the ejection element substrate 340 includes a plurality of arranged supply connection channels 323 and a plurality of arranged collection connection channels 324. Furthermore, the ejection element substrate 340 includes the common supply channel 18 communicating with the plurality of supply connection channels 323, and the common collecting channel 19 communicating with the plurality of collection connection channels 324. The ink channel in the ejection unit 3 is formed by communicating the ink supply channel 48 or the ink collecting channel 49 (see FIG. 3) provided in the first supporting member 4 with a channel provided in the ejection module 300. A supporting member supply port 211 is a cross-sectional opening that forms the ink supply channel 48, and a supporting member collection port 212 is a cross-sectional opening that forms the ink collecting channel 49.

The ink supplied to the ejection unit 3 is supplied from the circulation unit 54 (see FIG. 3A) side to the ink supply channel 48 (see FIG. 3A) of the first supporting member 4. The ink flowing through the supporting member supply port 211 in the ink supply channel 48 is supplied to the common supply channel 18 of the ejection element substrate 340 through the ink supply channel 48 (see FIG. 3A) and the ink supply ports 311 of the opening plate 330 and enters the supply connection channels 323. These constitute a channel on the supply side. The ink then flows into the collection connection channels 324 on the collection side through the pressure chamber 12 (see FIG. 3B) of the ejection-port-forming member 320. The ink flow in the pressure chamber 12 is described in detail later.

In the channel on the collection side, the ink in the collection connection channels 324 flows into the common collecting channel 19. The ink then flows from the common collecting channel 19 to the ink collecting channel 49 of the first supporting member 4 through the ink collection ports 312 of the opening plate 330 and is collected in the circulation unit 54 through the supporting member collection port 212.

A region without the ink supply ports 311 or the ink collection ports 312 in the opening plate 330 corresponds to a region for partitioning the supporting member supply port 211 and the supporting member collection port 212 in the first supporting member 4. The first supporting member 4 also has no opening in this region. Such a region is used as a bonding region for bonding the ejection module 300 and the first supporting member 4 together.

In the opening plate 330 illustrated in FIG. 12, a plurality of arrays each composed of a plurality of openings arranged in the X direction are arranged in the Y direction, and the openings for supply (IN) and the openings for collection (OUT) are alternately arranged in the Y direction so as to be shifted by a half pitch in the X direction. In the ejection element substrate 340 illustrated in FIG. 13, the common supply channel 18 communicating with the plurality of supply connection channels 323 arranged in the Y direction and the common collecting channel 19 communicating with the plurality of collection connection channels 324 arranged in the Y direction are alternately arranged in the X direction. The common supply channels 18 and the common collecting channels 19 are divided for each type of ink, and the number of common supply channels 18 and the number of common collecting channels 19 to be arranged are determined in accordance with the number of ejection port arrays of each color. The numbers of the supply connection channels 323 and the collection connection channels 324 to be arranged also correspond to the number of the ejection ports 13. It does not necessarily require the one-to-one relationship, and one supply connection channel 323 and one collection connection channel 324 may be provided for the plurality of ejection ports 13.

The opening plate 330 and the ejection element substrate 340 are stacked and bonded to each other such that the channel of each ink communicates with each other to constitute the ejection module 300, and are supported by the first supporting member 4, thereby forming the ink channel including the supply channel and the collecting channel as described above.

Figure 14A:
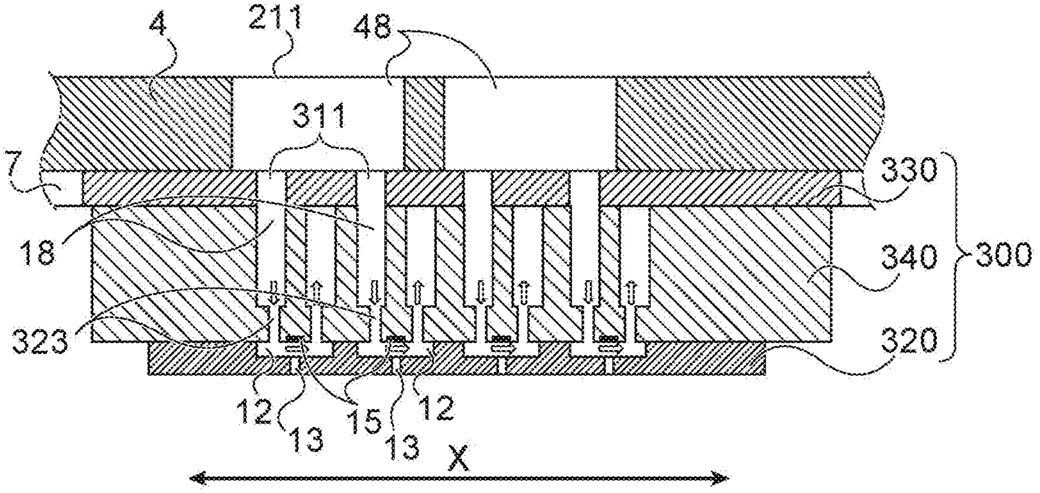
FIGS. 14A to 14C are cross-sectional views of an ink flow in an ejection unit.
Figure 14B:
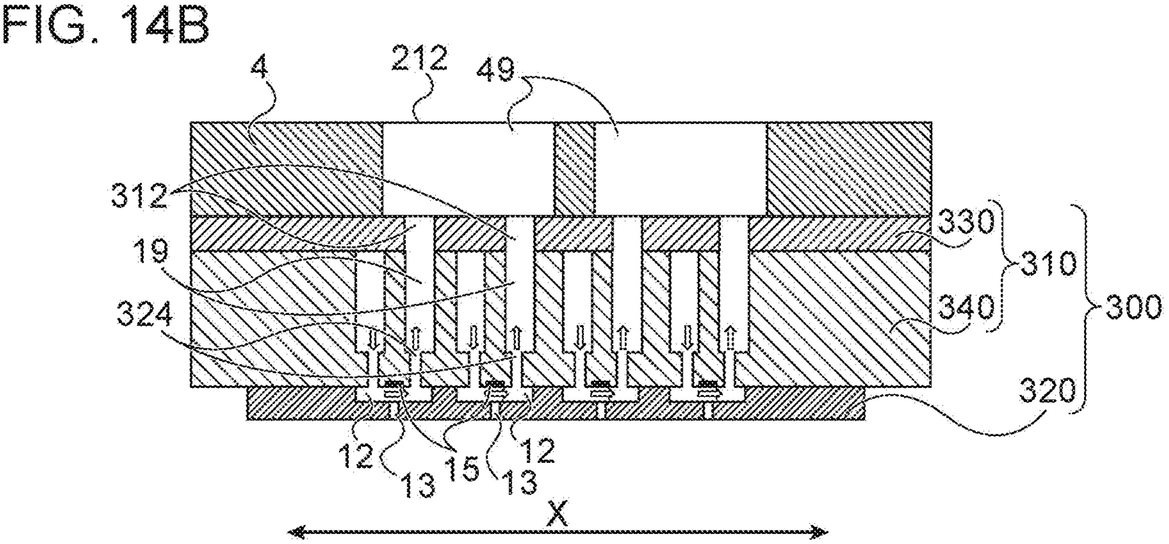
Figure 14C:
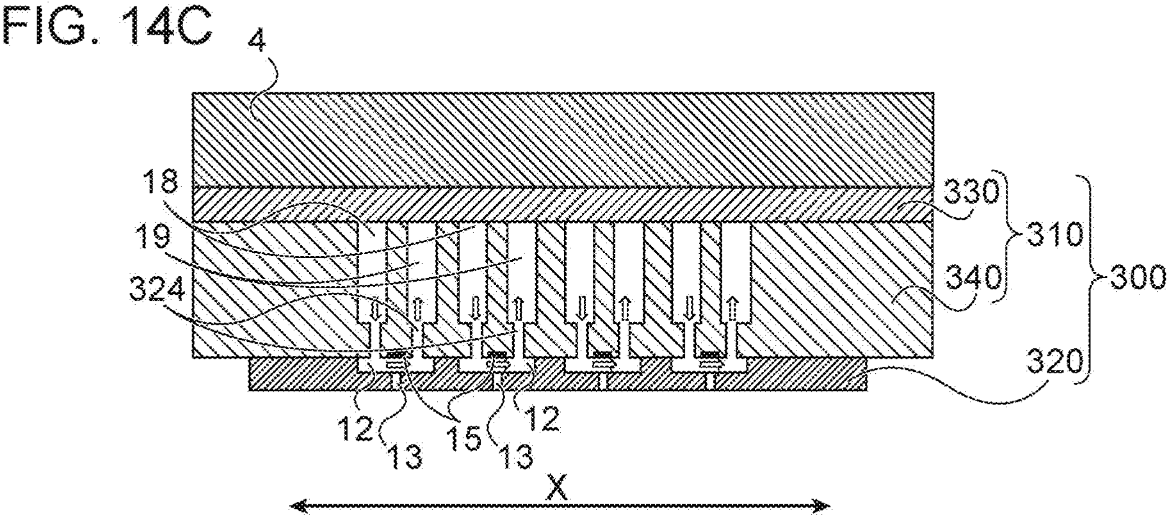

FIGS. 14A to 14C are cross-sectional views of ink flows in different portions of the ejection unit 3. FIG. 14A illustrates a cross section taken along the line XIVA-XIVA of FIG. 11A and illustrates a cross section of a portion where the ink supply channel 48 and the ink supply ports 311 communicate with each other in the ejection unit 3. FIG. 14B illustrates a cross section taken along the line XIVB-XIVB of FIG. 11A and illustrates a cross section of a portion where the ink collecting channel 49 and the ink collection ports 312 communicate with each other in the ejection unit 3. FIG. 14C illustrates a cross section taken along the line XIVC-XIVC of FIG. 11A and illustrates a cross section of a portion where the ink supply ports 311 and the ink collection ports 312 do not communicate with the channel of the first supporting member 4.

In the supply channel for supplying ink, as illustrated in FIG. 14A, the ink is supplied from a portion where the ink supply channel 48 of the first supporting member 4 overlaps and communicates with the ink supply ports 311 of the opening plate 330. In the collecting channel for collecting ink, as illustrated in FIG. 14B, the ink is collected from a portion in which the ink collecting channel 49 of the first supporting member 4 overlaps and communicates with the ink collection ports 312 of the opening plate 330. As illustrated in FIG. 14C, in the ejection unit 3, the opening plate 330 has a region without openings. In such a region, ink is not supplied or collected between the ejection element substrate 340 and the first supporting member 4. Ink is supplied in a region with the ink supply ports 311 as illustrated in FIG. 14A and is collected in a region with the ink collection ports 312 as illustrated in FIG. 14B. Although the configuration including the opening plate 330 is described as an example in the present embodiment, a configuration without the opening plate 330 may also be employed. For example, channels corresponding to the ink supply channel 48 and the ink collecting channel 49 may be formed in the first supporting member 4, and the ejection element substrate 340 may be bonded to the first supporting member 4.

Figure 15A:
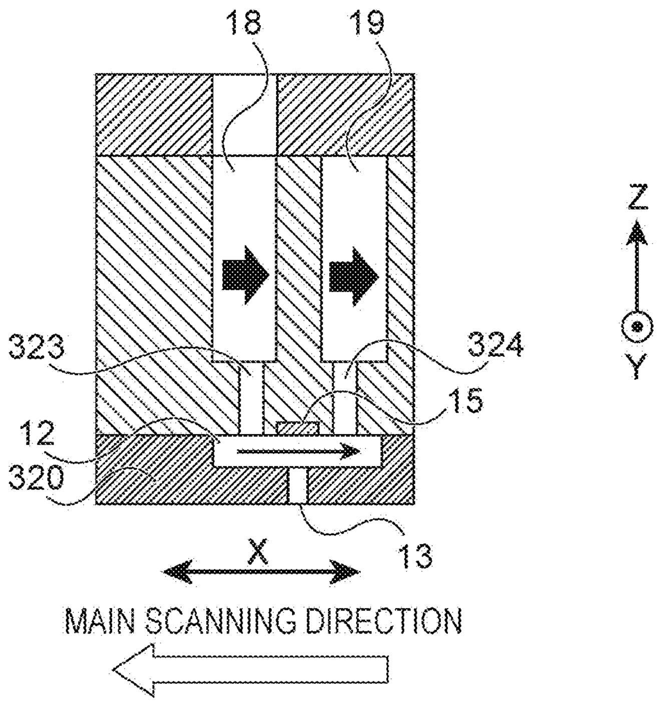
FIGS. 15A and 15B are cross-sectional views of the vicinity of an ejection port.
Figure 15B:
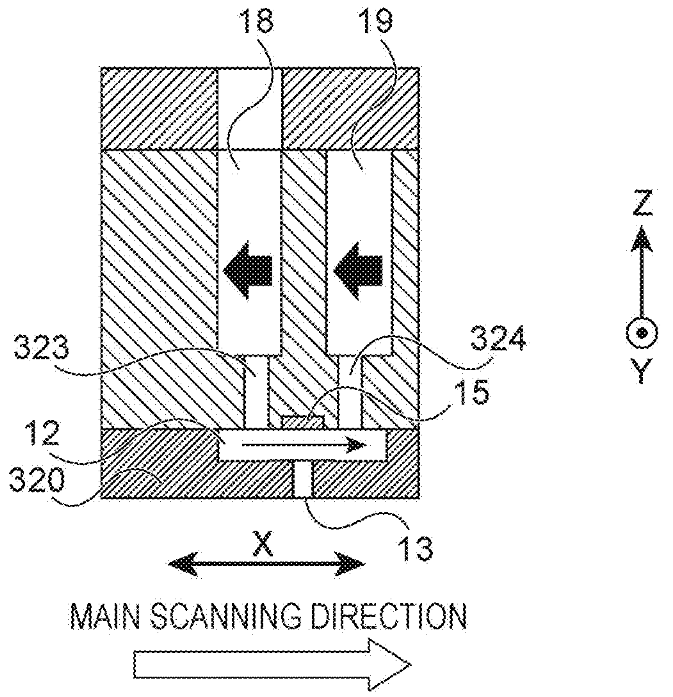
Figure 16A:
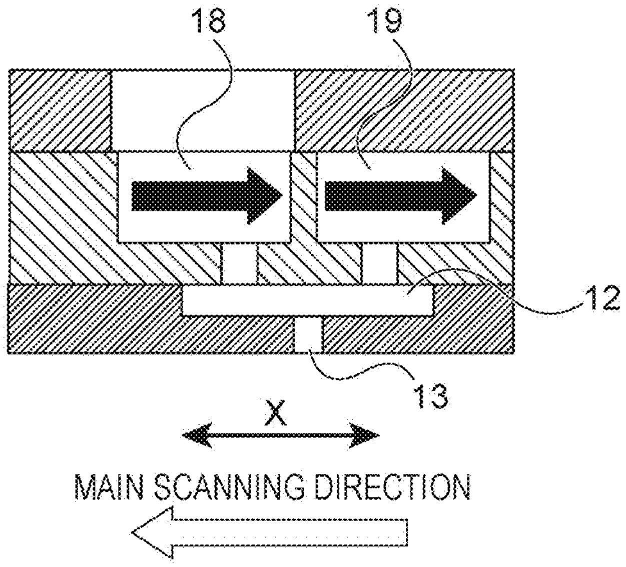
FIGS. 16A and 16B are cross-sectional views of comparative examples of the vicinity of an ejection port.
Figure 16B:
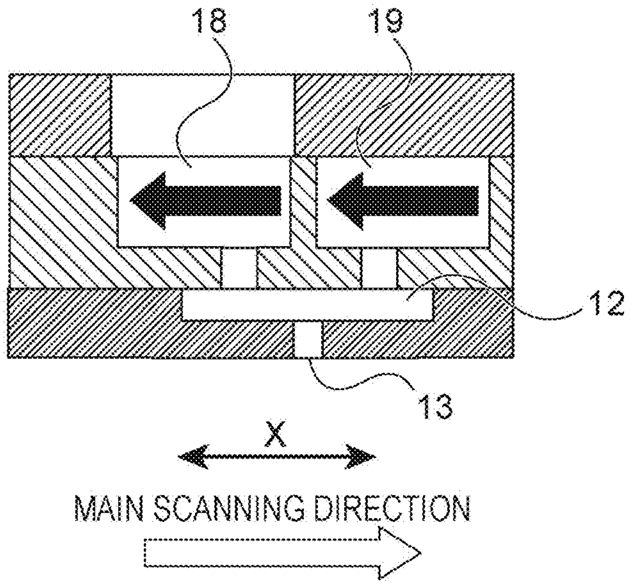

FIGS. 15A and 15B are cross-sectional views of the vicinity of the ejection port 13 in the ejection module 300. FIGS. 16A and 16B are cross-sectional views of an ejection module including the common supply channel 18 and the common collecting channel 19 extended in the X direction serving as a comparative example. The thick arrows in the common supply channel 18 and the common collecting channel 19 in FIGS. 15A and 15B and 16A and 16B indicate the oscillation of ink in an embodiment with a serial liquid ejection apparatus 50. Ink supplied to the pressure chamber 12 through the common supply channel 18 and the supply connection channel 323 is ejected from the ejection port 13 by driving the ejection element 15. When the ejection element 15 is not driven, the ink is collected from the pressure chamber 12 to the common collecting channel 19 through the collection connection channel 324, which is a collecting channel.

In the embodiment with the serial liquid ejection apparatus 50, when such a circulating ink is ejected, the ejection of the ink is considerably affected by the oscillation of the ink in the ink channel due to the main scanning with the liquid ejection head 1. More specifically, the influence of the oscillation of the ink in the ink channel may appear as a difference in the ink ejection rate or a deviation in the ejection direction. As illustrated in FIGS. 16A and 16B, when the common supply channel 18 and the common collecting channel 19 have a wide cross-sectional shape in the X direction, which is the main scanning direction, the ink in the common supply channel 18 and the common collecting channel 19 is likely to receive an inertial force in the main scanning direction and is subjected to a large oscillation. Consequently, the oscillation of the ink may affect the ejection of the ink from the ejection port 13. The common supply channel 18 and the common collecting channel 19 extended in the X direction may result in an increased distance between colors and lower printing efficiency.

Thus, both the common supply channel 18 and the common collecting channel 19 in the present embodiment extend in the Y direction in the cross sections illustrated in FIGS. 15A and 15B, and also extend in the Z direction perpendicular to the X direction, which is the main scanning direction. Such a configuration can reduce the channel width of each of the common supply channel 18 and the common collecting channel 19 in the main scanning direction. Reducing the channel width of each of the common supply channel 18 and the common collecting channel 19 in the main scanning direction reduces the oscillation of ink due to the inertial force (the thick black arrow in the drawing) acting on the ink in the common supply channel 18 and the common collecting channel 19 in the direction opposite to the main scanning direction during the main scanning. This can reduce the influence of the oscillation of ink on the ejection of the ink. Furthermore, the common supply channel 18 and the common collecting channel 19 extending in the Z direction increase the cross-sectional area and reduce the channel pressure drop.

Although the channel width of each of the common supply channel 18 and the common collecting channel 19 in the main scanning direction is decreased to reduce the oscillation of ink in the common supply channel 18 and the common collecting channel 19 during the main scanning as described above, the oscillation is not completely eliminated. Thus, to reduce the occurrence of a difference in ejection of different types of ink that may be still caused by reduced oscillation, in the present embodiment, the common supply channel 18 and the common collecting channel 19 are disposed at positions overlapping in the X direction.

As described above, in the present embodiment, the supply connection channel 323 and the collection connection channel 324 are provided for the ejection port 13 and have a correspondence of being arranged side by side in the X direction with the ejection port 13 interposed therebetween. Thus, when there is a portion where the common supply channel 18 and the common collecting channel 19 are not superposed with each other in the X direction, and the correspondence between the supply connection channel 323 and the collection connection channel 324 in the X direction is broken, this affects the flow and ejection of the ink in the X direction in the pressure chamber 12. When the influence of the oscillation of ink is added thereto, the ejection of ink in each ejection port may be further affected.

Thus, the common supply channel 18 and the common collecting channel 19 arranged at positions overlapping in the X direction have almost the same ink oscillation during the main scanning at any position in the Y direction in which the ejection ports 13 are arranged. This prevents a great variation in the pressure difference between the common supply channel 18 side and the common collecting channel 19 side in the pressure chamber 12 and allows stable ejection.

In a certain type of liquid ejection head that circulates ink, a channel for supplying the ink to the liquid ejection head and a channel for collecting the ink are the same. In the present embodiment, however, the common supply channel 18 and the common collecting channel 19 are different. The supply connection channel 323 and the pressure chamber 12 communicate with each other, the pressure chamber 12 and the collection connection channel 324 communicate with each other, and ink is ejected from the ejection port 13 of the pressure chamber 12. Thus, the pressure chamber 12, which is a path connecting the supply connection channel 323 and the collection connection channel 324, has the ejection port 13. Thus, the pressure chamber 12 has an ink flow from the supply connection channel 323 to the collection connection channel 324, and the ink in the pressure chamber 12 is efficiently circulated. Although the ink in the pressure chamber 12 is likely to be affected by the evaporation of the ink from the ejection port 13, the efficiently circulated ink in the pressure chamber 12 can maintain its fresh state.

Because the two channels of the common supply channel 18 and the common collecting channel 19 communicate with the pressure chamber 12, ink can be supplied from both channels when ejection at a high flow rate is required. Thus, the present embodiment has an advantage over a configuration with only one channel for supplying and collecting ink in that not only circulation can be efficiently performed but also ejection at a high flow rate can be performed.

The influence of the oscillation of ink can be reduced by arranging the common supply channel 18 and the common collecting channel 19 at positions close to each other in the X direction. The distance between the channels may desirably range from 75 μm to 100 μm.

Figure 17:
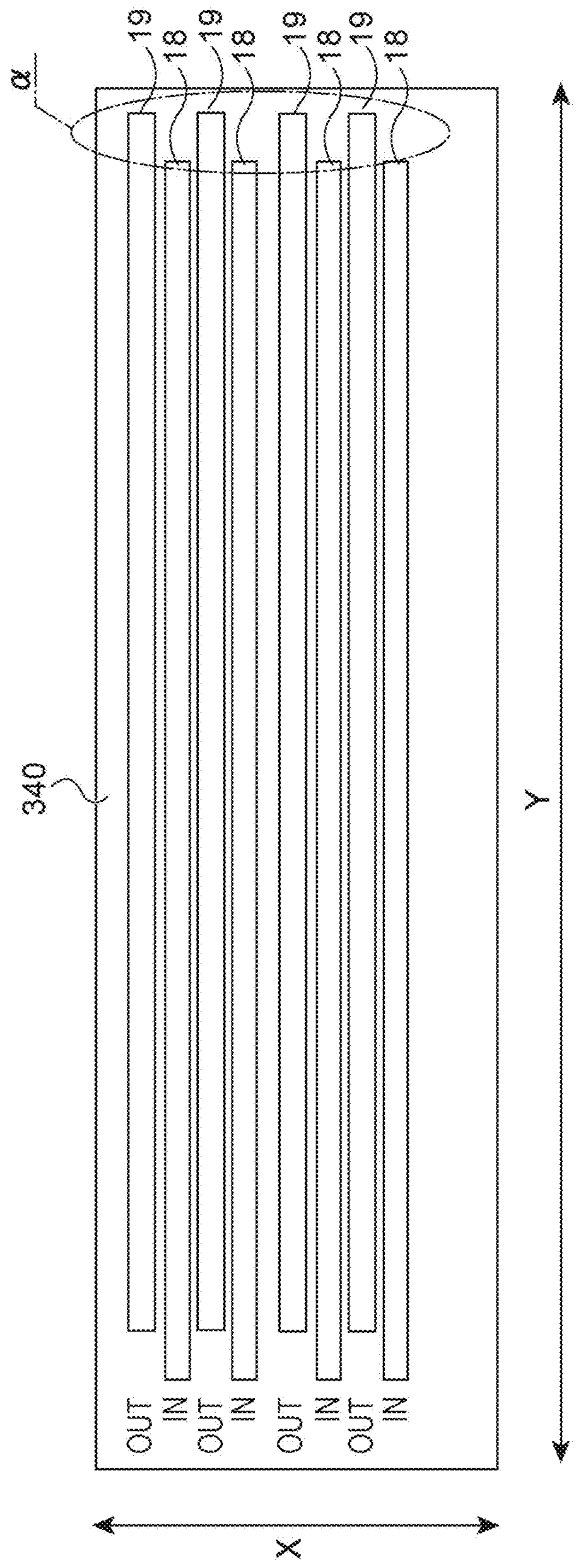
FIG. 17 is a view of a comparative example of an ejection element substrate.

FIG. 17 is a view of the ejection element substrate 340 as a comparative example. In FIG. 17, the supply connection channel 323 and the collection connection channel 324 are not illustrated. Having received thermal energy from the ejection element 15 in the pressure chamber 12, the ink flowing into the common collecting channel 19 has a higher temperature than the ink in the common supply channel 18. In the comparative example, as in the a portion within the dash-dotted line in FIG. 17, a portion of the ejection element substrate 340 in the X direction has only the common collecting channel 19. In this case, this portion may locally have an increased temperature, cause temperature variations in the ejection module 300, and affect ejection.

Ink with a lower temperature than that in the common collecting channel 19 flows through the common supply channel 18. Thus, when the common supply channel 18 and the common collecting channel 19 are adjacent to each other, in the vicinity thereof, the temperatures of the common supply channel 18 and the common collecting channel 19 partially cancel each other and do not increase significantly. Thus, the common supply channel 18 and the common collecting channel 19 can have almost the same length, be present at positions overlapping in the X direction, and be adjacent to each other.

Figure 18A:
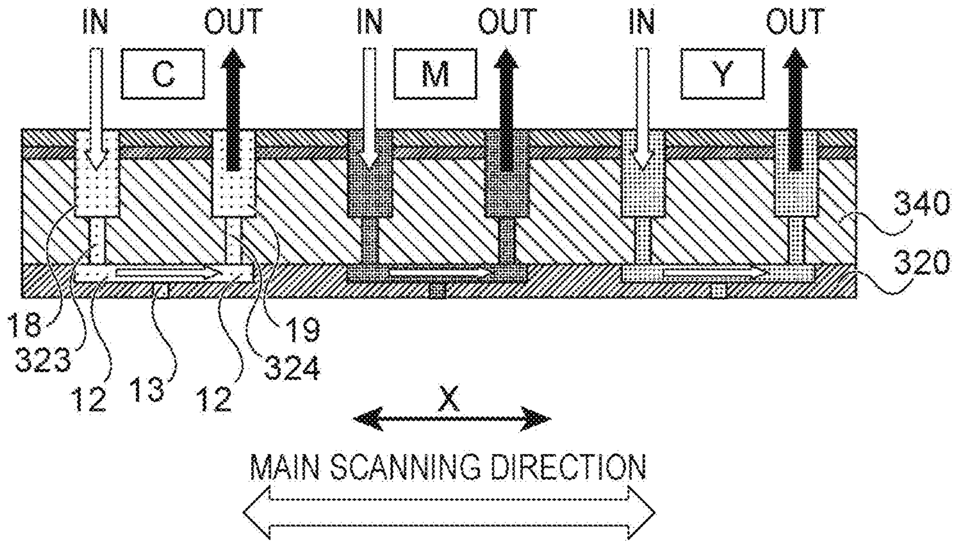
FIGS. 18A and 18B are views of a channel configuration of a liquid ejection head.
Figure 18B:
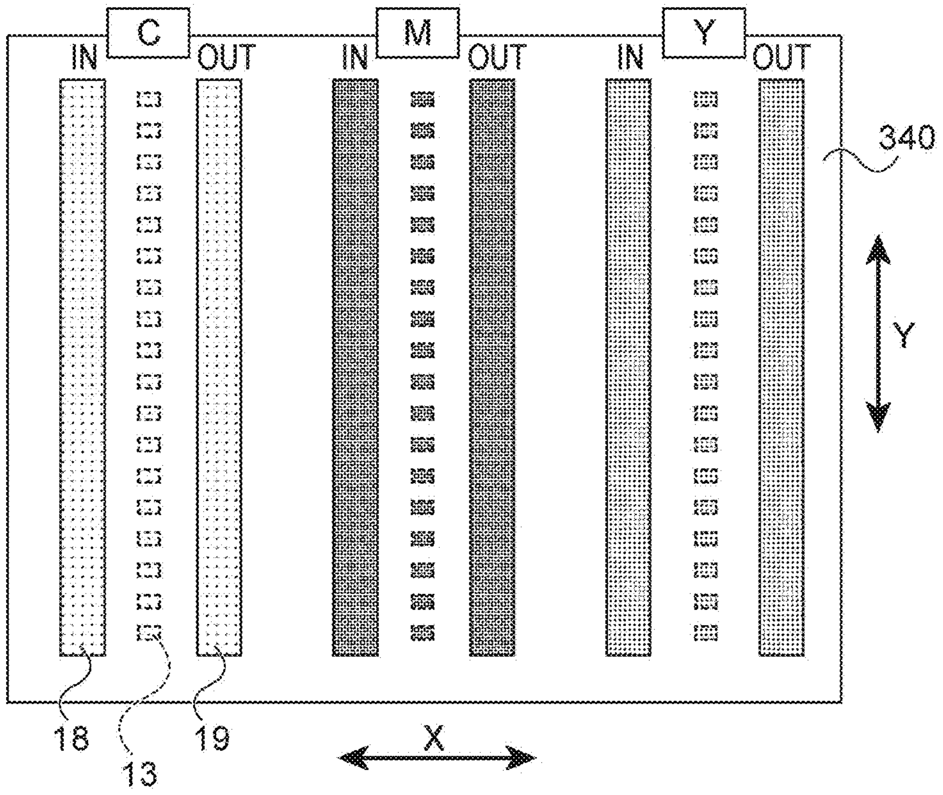

FIGS. 18A and 18B illustrate a channel configuration of the liquid ejection head 1 for three color inks of cyan (C), magenta (M), and yellow (Y). As illustrated in FIG. 18A, the liquid ejection head 1 has a circulation channel for each type of ink. The pressure chamber 12 is provided in the X direction, which is the main scanning direction of the liquid ejection head 1. As illustrated in FIG. 18B, the common supply channel 18 and the common collecting channel 19 are provided along the ejection port array of the ejection ports 13 and extend in the Y direction with the ejection port array interposed between the common supply channel 18 and the common collecting channel 19.

<Connection of Main Body Portion and Liquid Ejection Head>

Figure 19:
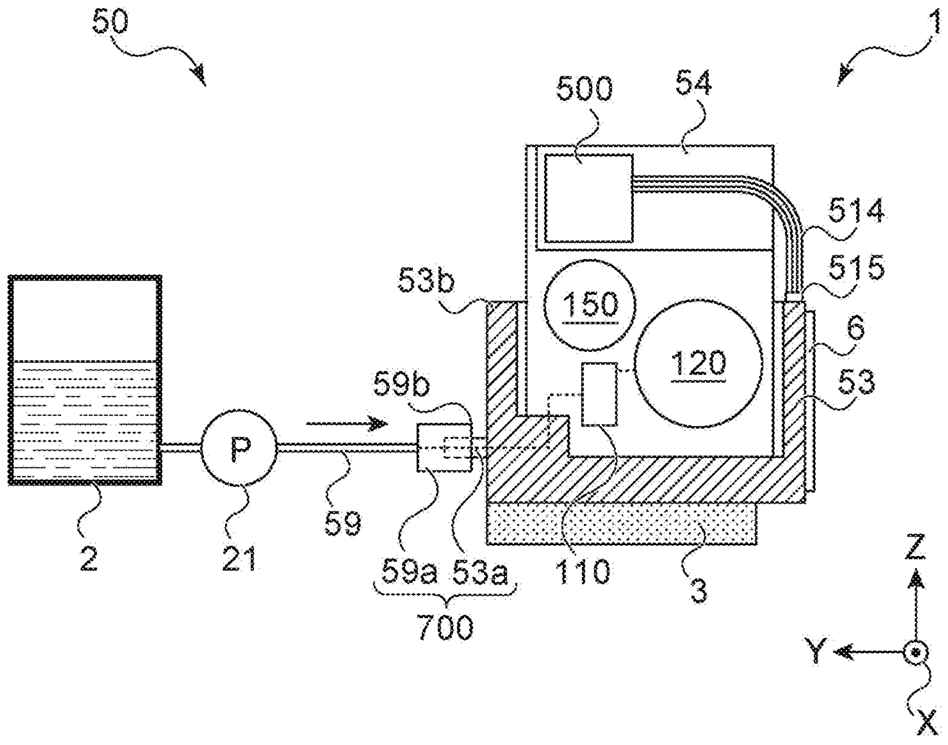
FIG. 19 is a view of a connection state between a main body portion of a liquid ejection apparatus and a liquid ejection head.

FIG. 19 is a schematic view illustrating in more detail the connection state between the ink tank 2, the external pump 21, and the liquid ejection head 1 in the main body portion of the liquid ejection apparatus 50 according to the present embodiment and the arrangement of the circulating pump and the like. In the liquid ejection apparatus 50 according to the present embodiment, the liquid ejection head 1 can be easily replaced alone in case of a trouble in the liquid ejection head 1. More specifically, there is provided a liquid connecting portion 700 that can easily perform connection and disconnection between the ink supply tube 59 connected to the external pump 21 and the liquid ejection head 1. Thus, only the liquid ejection head 1 can be easily attached to and detached from the liquid ejection apparatus 50.

As illustrated in FIG. 19, the liquid connecting portion 700 includes a liquid connector insertion slot 53*a* protruding from the head housing 53 of the liquid ejection head 1 and a cylindrical liquid connector 59*a* into which the liquid connector insertion slot 53*a* can be inserted. The liquid connector insertion slot 53*a* is fluidly connected to an ink supply channel (inflow channel) formed in the liquid ejection head 1 and is connected to the first pressure regulation unit 120 via the filter 110. The liquid connector 59*a* is provided at a tip of the ink supply tube 59 connected to the external pump 21 that pressure-feeds the ink from the ink tank 2 to the liquid ejection head 1.

As described above, in the liquid ejection head 1 illustrated in FIG. 19, the liquid connecting portion 700 allows the liquid ejection head 1 to be easily attached, detached, and replaced. When the sealing property between the liquid connector insertion slot 53*a* and the liquid connector 59*a* is deteriorated, however, the ink pressure-fed by the external pump 21 may leak from the liquid connecting portion 700. Leaked ink adhered to the circulating pump 500 or the like may cause a trouble in an electrical system. Thus, in the present embodiment, the circulating pump and the like are disposed as described below.

<Arrangement of Circulating Pump and the Like>

As illustrated in FIG. 19, in the present embodiment, the circulating pump 500 is disposed above the liquid connecting portion 700 in the direction of gravity to prevent the ink leaked from the liquid connecting portion 700 from adhering to the circulating pump 500. More specifically, the circulating pump 500 is disposed above the liquid connector insertion slot 53*a*, which is a liquid inlet of the liquid ejection head 1, in the direction of gravity. Furthermore, the circulating pump 500 is disposed so as not to be in contact with the members constituting the liquid connecting portion 700. Thus, even if ink leaks from the liquid connecting portion 700, the ink flows horizontally in the opening direction of the liquid connector 59*a* or downward in the direction of gravity and is less likely to reach the circulating pump 500 located above in the direction of gravity. Furthermore, the circulating pump 500 is disposed at a position away from the liquid connecting portion 700, and the ink is therefore less likely to reach the circulating pump 500 along a member.

Furthermore, an electrical connection portion 515 that electrically connects the circulating pump 500 and the electric contact substrate 6 via a flexible wiring member 514 is provided above the liquid connecting portion 700 in the direction of gravity. This can reduce the possibility of an electrical trouble caused by ink from the liquid connecting portion 700.

In the present embodiment, the head housing 53 has a wall portion 52*b*, which can block ink even if the ink is spouted from an opening 59*b* of the liquid connecting portion 700 and reduce the possibility of the ink reaching the circulating pump 500 or the electrical connection portion 515.

[Image-Recording Method]

In the present disclosure, an image-recording method includes a method of ejecting an ink described later from the liquid ejection head to record an image on a record medium described later. In particular, in an ink jet recording method, an ink can be ejected from an ink jet liquid ejection head (ink jet recording head) to record an image.

(1) Record Medium

The record medium may be, but is not limited to, a transparent or colored record medium. The record medium may be a less absorbent medium (unabsorbent medium) with low liquid medium absorbency, such as a resin film. Ink can be applied to a unit region of the record medium by multipass recording in which a recording head and the record medium are relatively moved multiple times. In particular, a white ink and a chromatic color ink can be applied to a unit region by different relative scans. This increases the time intervals between inks coming into contact with each other and easily suppresses mixing. The unit region can be set as an arbitrary region, such as one pixel or one band.

(2) Ink

An ink that can be ejected from a liquid ejection head of the present disclosure is described in detail below with reference to embodiments. In the following description, with respect to a salt compound, although the salt is dissociated into ions in ink, for convenience, it is expressed as "the salt is contained". Titanium oxide or titanium oxide particles may be simply referred to as the "pigment". An aqueous ink for ink jet recording may be simply referred to as the "ink". Unless otherwise specified, physical properties are determined at normal temperature (25° C.). For recording of an image using a white ink, the white ink may be used as a background color treatment of a chromatic color ink. In such a case, an image may be recorded by applying a chromatic color ink (an ink of black, cyan, magenta, yellow, or the like) so as to overlap at least part of the region to which the white ink has been applied. It can also be used for back print of applying a white ink so as to overlap at least part of the region to which a chromatic color ink has been applied.

<Aqueous Ink and Method for Producing Aqueous Ink>

In the present disclosure, a white ink containing titanium oxide as a white pigment may be used as an ink. In the present disclosure, the ink is not necessarily a so-called "curable ink". Thus, in the present disclosure, the ink does not necessarily contain a compound, such as a polymerizable monomer that can be polymerized by external energy, such as heat or light. Components constituting an ink according to the present disclosure, physical properties of the ink, a method for producing the ink, and the like are described in detail below.

Coloring Material

An ink contains titanium oxide as a coloring material (pigment). The titanium oxide may be titanium oxide particles subjected to surface treatment with a specific inorganic oxide. Thus, an ink may contain titanium oxide particles with a surface coated with a specific inorganic oxide. The titanium oxide particle content (% by mass) of an ink is preferably 0.10% by mass or more and 20.00% by mass or less of the total mass of the ink. The titanium oxide particle content (% by mass) of an ink is more preferably 1.00% by mass or more and 20.00% by mass or less of the total mass of the ink. The titanium oxide particle content (% by mass) of an ink is particularly preferably 1.00% by mass or more and 15.00% by mass or less of the total mass of the ink.

Titanium oxide is a white pigment and has three crystal forms of a rutile type, an anatase type, and a brookite type. In particular, rutile titanium oxide can be used. Titanium oxide may be industrially produced by a sulfuric acid method or a chlorine method, and titanium oxide used in the present disclosure may be produced by any method.

Titanium oxide particles preferably have a volume-based cumulative 50% particle size (hereinafter also referred to as the average particle size) of 200 nm or more and 500 nm or less. In particular, titanium oxide particles more preferably have a volume-based cumulative 50% particle size of 200 nm or more and 400 nm or less. The volume-based cumulative 50% particle size (D50) of titanium oxide particles is the diameter of a particle at an integrated value of 50% of the total volume of particles measured from the smallest particle size in a cumulative particle size curve. D50 of titanium oxide particles can be measured under the conditions of, for example, SetZero: 30 seconds, number of measurements: 3, measurement time: 180 seconds, shape: non-spherical, and refractive index: 2.60. A particle size analyzer using a dynamic light scattering method can be used as a particle size distribution analyzer. As a matter of course, the measurement conditions and the like are not limited to the above.

Titanium oxide may be subjected to surface treatment with alumina and silica. The surface treatment is expected to reduce photocatalytic activity and improve dispersibility. The term "alumina", as used herein, is a general term for oxides of aluminum, such as aluminum oxide. The term "silica", as used herein, is a general term for silicon dioxide or a substance composed of silicon dioxide. The majority of alumina and silica that coat titanium oxide is present in the form of silicon dioxide and aluminum oxide.

The titanium oxide content (% by mass) of titanium oxide particles is preferably 90.00% by mass or more of the total mass of the titanium oxide particles. The titanium oxide content (% by mass) of titanium oxide particles is preferably 98.50% by mass or less of the total mass of the titanium oxide particles. The alumina content (% by mass) of titanium oxide particles needs to be 0.50 times or more and 1.00 time or less the silica content (% by mass) in terms of mass ratio. A mass ratio of less than 0.50 times or more than 1.00 time results in an ink with low ejection stability. The silica content (% by mass) of titanium oxide particles is preferably 1.00% by mass or more and 4.00% by mass or less of the total mass of the titanium oxide particles. A silica content (% by mass) of less than 1.00% by mass may result in an insufficient affinity for a compound represented by the general formula (1) and an ink with insufficient ejection stability. A silica content (% by mass) of more than 4.00% by mass may result in a significant amount of compound represented by the general formula (1) adsorbed on titanium oxide particles even surface-treated with alumina and may result in an ink with insufficient ejection stability. The alumina content (% by mass) of titanium oxide particles is preferably 0.50% by mass or more and 4.00% by mass or less of the total mass of the titanium oxide particles.

The alumina and silica contents of titanium oxide particles, that is, the amounts of alumina and silica coating may be measured, for example, by the quantitative analysis of aluminum and silicon elements using inductively coupled plasma (ICP) emission spectrometry. In such a case, it can be calculated by converting the obtained values of aluminum and silicon into their oxides, that is, alumina and silica, on the assumption that all the atoms covering the surface are oxides. The aluminum element content (% by mass) of titanium oxide particles determined by inductively coupled plasma emission spectrometry is 0.57 times or more and 1.13 times or less the silicon element content (% by mass) in terms of mass ratio. When this value is converted into oxides thereof, that is, alumina and silica, the alumina content (% by mass) of titanium oxide particles is 0.50 times or more and 1.00 time or less the silica content (% by mass) in terms of mass ratio.

The surface treatment method for titanium oxide may be wet processing, dry processing, or the like. For example, titanium oxide can be dispersed in a liquid medium and then reacted with a surface treating agent, such as sodium aluminate or sodium silicate, for surface treatment, and the ratio of the surface treating agent can be appropriately changed for adjustment to desired characteristics. In addition to alumina and silica, an inorganic oxide, such as zinc oxide or zirconia, or an organic substance, such as a polyol, can be used for the surface treatment without losing the advantages of the present disclosure.

An ink may contain a pigment other than titanium oxide without losing the advantages of the present disclosure. In such a case, an ink of a color other than white ink may be used. The other pigment content (% by mass) of an ink is preferably 0.10% by mass or more and 5.00% by mass or less, more preferably 0.10% by mass or more and 1.00% by mass or less, of the total mass of the ink.

Compound Represented by General Formula (1)

An ink can contain a compound represented by the following general formula (1) as a dispersant for dispersing titanium oxide particles. The amount (% by mass) of compound represented by the general formula (1) in the ink is preferably 0.01% by mass or more and 1.00% by mass or less, more preferably 0.02% by mass or more and 0.50% by mass or less, of the total mass of the ink.

(1)

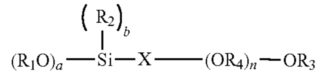

(In the general formula (1), $R_1$, $R_2$, and $R_3$ each independently denote a hydrogen atom or an alkyl group with 1 to 4 carbon atoms. $R_4$s each independently denote an alkylene group with 2 to 4 carbon atoms. X denotes a single bond or an alkylene group with 1 to 6 carbon atoms. n ranges from 6 to 24. a ranges from 1 to 3, b ranges from 0 to 2, and a+b=3)

In the general formula (1), $R_1$, $R_2$, and $R_3$ each independently denote a hydrogen atom or an alkyl group with 1 to 4 carbon atoms. The alkyl group with 1 to 4 carbon atoms may be a methyl group, an ethyl group, a n-propyl group, an i-propyl group, or a n-butyl group. In particular, a methyl group can be used from the perspective of ease of hydrolysis. When $R_1$, $R_2$, and $R_3$ each independently denote an alkyl group with more than 4 carbon atoms, it is difficult to form a silanol group by hydrolysis, and an affinity for titanium oxide particles cannot be obtained. Thus, titanium oxide particles cannot be stably dispersed, and the ink cannot have ejection stability. a that denotes the number of $R_1O$ ranges from 1 to 3, b that denotes the number of $R_2$ ranges from 0 to 2, and a+b=3. In particular, a is preferably 3, and b is preferably 0, that is, all the three substituents on the silicon atom can be $R_1O$.

In the general formula (1), $R_4$s each independently denote an alkylene group with 2 to 4 carbon atoms. The alkylene group with 2 to 4 carbon atoms may be an ethylene group, a n-propylene group, an i-propylene group, or a n-butylene group. In particular, an ethylene group can be used. The number of $OR_4$, that is, n (average value) that denotes the number of alkylene oxide groups ranges from 6 to 24. n of less than 6 results in an alkylene oxide chain with too short a length and consequently an insufficient repulsive force due to steric hindrance and an ink with low ejection stability. n of more than 24 results in an alkylene oxide chain with too long a length and consequently enhanced hydrophilicity and easy liberation in an aqueous medium. This results in an insufficient affinity for a surface hydroxy group of titanium oxide particles and aggregation of titanium oxide particles. Thus, titanium oxide particles cannot be stably dispersed, and the ink cannot have ejection stability.

In the general formula (1), X denotes a single bond or an alkylene group with 1 to 6 carbon atoms. When X denotes a single bond, it means that the silicon atom is directly bonded to $OR_4$. The alkylene group with 1 to 6 carbon atoms may be a methylene group, an ethylene group, a n-propylene group, an i-propylene group, a n-butylene group, a n-pentylene group, a n-hexylene group, or the like. In particular, a n-propylene group can be used. When X denotes an alkylene group with more than 6 carbon atoms, a compound represented by the general formula (1) has excessively high hydrophobicity, titanium oxide particles cannot be stably dispersed, and the ink cannot have ejection stability.

A compound represented by the general formula (1), which is a dispersant for titanium oxide particles, can be a compound represented by the following general formula (2). Having three $OR_1$s bonded to the silicon atom, a compound represented by the general formula (2) can be partially hydrolyzed in an aqueous medium and form three hydroxy groups bonded to the silicon atom, thus increasing a portion with an affinity for titanium oxide particles. A compound represented by the following general formula (2) has a repeating structure of an ethylene oxide group. Thus, the ethylene oxide chain can extend moderately in an aqueous medium, and a repulsive force due to steric hindrance can be obtained.

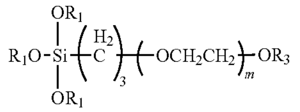

(2)

(In the general formula (2), $R_1$ and $R_3$ each independently denote a hydrogen atom or an alkyl group with 1 to 4 carbon atoms. m ranges from 8 to 24.)

The amount of compound represented by the general formula (1) (% by mass) in ink is preferably 0.002 times or more and 0.10 times or less the titanium oxide particle content (% by mass) in terms of mass ratio. A mass ratio of less than 0.002 times may result in a smaller effect of stably dispersing titanium oxide particles and an ink with insufficient ejection stability. A mass ratio of more than 0.10 times tends to result in too high a proportion of a compound represented by the general formula (1) and condensation (self-condensation) between molecules of a compound represented by the general formula (1). This may result in a compound represented by the general formula (1) consumed without acting as a dispersant, a weak action of stably dispersing titanium oxide particles, and an ink with insufficient ejection stability.

A compound represented by the general formula (1) is hydrogen-bonded to a surface hydroxy group of titanium oxide particles and is considered to partially form a covalent bond by a dehydration reaction. In the present disclosure, however, a compound represented by the general formula (1) can disperse titanium oxide particles without forming a covalent bond with the titanium oxide particles. Thus, the amount of a compound represented by the general formula (1) covalently bonded to titanium oxide particles is very small and is negligible. Thus, the titanium oxide particle content does not include a covalently bonded compound represented by the general formula (1). On the basis of study results by the present inventors, it has been found that too large an amount of a compound represented by the general formula (1) covalently bonded to titanium oxide particles results in an ink with lower ejection stability. The reason for this is considered as described below. In general, in a liquid medium with high permittivity, such as water, electrostatic attractive force is less likely to act, and titanium oxide particles move freely without significant environmental effects. When a compound represented by the general formula (1) is covalently bonded to titanium oxide particles, however, the hydrophilic portion ($OR_4$ portion) of the structure of the general formula (1) forms a hydrogen bond with water molecules and may consequently affect the movement of the titanium oxide particles. Thus, in a situation where liquid is deformed by an instantaneous pressure as in ink jet ejection, the characteristics as described above appear as a difference in ejection characteristics. Thus, the amount (% by mass) of a compound represented by the general formula (1) covalently bonded to titanium oxide particles is preferably 0.001 times or less the titanium oxide particle content (% by mass) in terms of mass ratio. A mass ratio of more than 0.001 times may result in an ink with insufficient ejection stability. The mass ratio may be 0.000 times. The amount of a compound represented by the general formula (1) covalently bonded to titanium oxide particles can be calculated by thermogravimetric analysis or the like.

Resin

An ink can contain a resin. The resin may be an acrylic resin, a urethane resin or a urea resin. In particular, an acrylic resin can be used. The resin content (% by mass) of an ink is preferably 1.00% by mass or more and 25.00% by mass or less, more preferably 3.00% by mass or more and 15.00% by mass or less, of the total mass of the ink. In particular, 5.00% by mass or more and 15.00% by mass or less is particularly preferred.

The resin can be contained in ink to improve various characteristics of an image to be recorded, such as scratch resistance and hiding power. The resin may be a block copolymer, a random copolymer, a graft copolymer, or a combination thereof. The resin may be a water-soluble resin that can be dissolved in an aqueous medium or resin particles to be dispersed in an aqueous medium. The resin particles do not need to contain a coloring material.

In the present specification, the phrase "resin is water-soluble" means that, when neutralized with an alkali in an amount equivalent to the acid value, the resin is present in an aqueous medium without a particle with a particle size measurable by a dynamic light scattering method. Whether or not the resin is water-soluble can be determined by the following method. First, a liquid (resin solid content: 10% by mass) containing a resin neutralized with an alkali (sodium hydroxide, potassium hydroxide, or the like) equivalent to the acid value is prepared. The prepared liquid is then diluted 10 times (on a volume basis) with pure water to prepare a sample solution. When the particle size of the resin in the sample solution is measured by the dynamic light scattering method, if a particle with a particle size is not observed, the resin can be determined to be water-soluble. The measurement conditions are, for example, SetZero: 30 seconds, number of measurements: 3, and measurement time: 180 seconds. A particle size analyzer using a dynamic light scattering method (for example, trade name "UPA-EX150", manufactured by Nikkiso Co., Ltd.) can be used as a particle size distribution analyzer. As a matter of course, the particle size distribution analyzer to be used, the measurement conditions, and the like are not limited to those described above.

The water-soluble resin preferably has an acid value of 80 mgKOH/g or more and 250 mgKOH/g or less, more preferably 100 mgKOH/g or more and 200 mgKOH/g or less. Resin particles, if present, preferably have an acid value of 0 mgKOH/g or more and 50 mgKOH/g or less. The resin preferably has a weight-average molecular weight of 1,000 or more and 30,000 or less, more preferably 5,000 or more and 15,000 or less. The weight-average molecular weight of the resin is a polystyrene equivalent molecular weight measured by gel permeation chromatography (GPC).

Aqueous Medium

An ink is an aqueous ink containing water as an aqueous medium. An ink may contain water or an aqueous medium that is a mixed solvent of water and a water-soluble organic solvent. The water can be deionized water (ion-exchanged water). The water content (% by mass) of the ink is preferably 50.00% by mass or more and 95.00% by mass or less of the total mass of the ink.

The water-soluble organic solvent is not particularly limited as long as the solvent is water-soluble (the solvent can dissolve in water at any ratio at 25° C.). More specifically, a monohydric or polyhydric alcohol, an alkylene glycol, a glycol ether, a nitrogen-containing polar compound, a sulfur-containing polar compound, or the like can be used. The water-soluble organic solvent content (% by mass) of the ink is preferably 3.00% by mass or more and 50.00% by mass or less, more preferably 10.00% by mass or more and 40.00% by mass or less, of the total mass of the ink. A water-soluble organic solvent content (% by mass) of less than 3.00% by mass may result in solidification of the ink in an ink jet recording apparatus and insufficient sticking resistance. A water-soluble organic solvent content (% by mass) of more than 50.00% by mass may result in ink supply failure.

Other Additive Agents

An ink may contain, in addition to the additive agents described above, other additive agents, such as a surfactant, a pH adjuster, an anticorrosive, a preservative, a fungicide, an antioxidant, a reducing inhibitor, an evaporation promoter, and/or a chelating agent, if necessary. In particular, the ink can contain a surfactant. The surfactant content (% by mass) of the ink is preferably 0.10% by mass or more and 5.00% by mass or less, more preferably 0.10% by mass or more and 2.00% by mass or less, of the total mass of the ink. The surfactant may be an anionic surfactant, a cationic surfactant, or a nonionic surfactant. In particular, a nonionic surfactant that has a low affinity for titanium oxide particles and produces an effect even in a small amount can be used to adjust various physical properties of ink.

Physical Properties of Ink

An ink is an ink applied to an ink jet system and can have physical properties appropriately adjusted for the ink jet system. An ink preferably has a surface tension of 10 mN/m or more and 60 mN/m or less, more preferably 20 mN/m or more and 40 mN/m or less, at 25° C. The surface tension of an ink can be adjusted by appropriately determining the type and content of the surfactant in the ink. In the present disclosure, a white ink preferably has a viscosity of 1.0 mPa·s or more and 10.0 mPa·s or less at 25° C. An ink preferably has a pH of 7.0 or more and 9.0 or less at 25° C. When an ink has a pH in this range, a compound represented by the general formula (1) is hydrolyzed and forms a silanol group, thus effectively exhibiting a weak affinity for titanium oxide particles. The pH of an ink can be measured with a typical pH meter equipped with a glass electrode.

Method for Producing Ink

In the present disclosure, a method for producing an ink includes a step of mixing a dispersion liquid of titanium oxide particles and other ink components. The dispersion liquid of titanium oxide particles is a dispersion liquid of titanium oxide particles produced by a production method described later. The other ink components may be water, a water-soluble organic solvent, and a resin to be further added, the "other additive agents" described above, and the like. An ink may be produced, for example, by stirring a dispersion liquid of titanium oxide particles and other ink components in an appropriate container. Conditions, such as the stirring speed, temperature, and time, can be appropriately determined in accordance with desired conditions. Furthermore, another known production process may be combined.

The present disclosure can provide a liquid ejection head and a liquid ejection apparatus that can effectively achieve circulation effects.

While the present invention has been described with reference to one or more embodiments, it is to be understood that the invention is not limited solely to the disclosed embodiments. The embodiments described above can be implemented solely or as a combination of a plurality of elements or features thereof where necessary or where the combination of the elements of features from individual embodiments in a single embodiment is beneficial. The scope of the following claims is to be accorded the broadest interpretation so as to encompass all such modifications and equivalent structures and functions apparent or obvious to the skilled person.

This application claims the benefit of Japanese Patent Application No. 2023-097646 filed Jun. 14, 2023, which is hereby incorporated by reference herein in its entirety.

What is claimed is:

1. A liquid ejection head comprising:

an ejection port portion with an ejection port configured to eject liquid in an ejection direction at a first end portion;

a pressure chamber that includes therein an energy-generating element configured to generate energy required to eject the liquid from the ejection port and communicates with the ejection port portion at a second end portion opposite the first end portion;

a supply channel configured to supply the liquid to the pressure chamber;

a collecting channel configured to collect the liquid from the pressure chamber; and a pump configured to cause the liquid in the collecting channel to flow into the supply channel, wherein $F_{ratio}$ represented by the following formula is 1.4 or less:

$$F_{ratio} = 1.619 \times \left(H^{-0.34} P^{-0.66} W\right)^{-0.1569} \times \log\left(U_x/U_v\right)^{-0.2560}$$

wherein W [μm] denotes a length of the ejection port in a flow direction of the liquid in the pressure chamber, P [μm] denotes a length of the ejection port portion in an ejection direction of the liquid from the ejection port, H [μm] denotes a height of the pressure chamber on an upstream side in the flow direction of the liquid in the pressure chamber, $U_v$ [m/s] denotes an evaporation speed in the ejection port, and $U_x$ [m/s] denotes a flow velocity of the liquid flowing through the pressure chamber.

2. The liquid ejection head according to claim 1, wherein the $F_{ratio}$ is 1.3 or less.

3. The liquid ejection head according to claim 1, wherein the $F_{ratio}$ is 1.2 or less.

4. The liquid ejection head according to claim 1, comprising:

a plurality of the ejection ports, wherein the $U_x$ [m/s] is represented by the following formula, $$U_x = Q/(S \times N)$$

wherein Q [$m^3$/s] denotes a flow rate of the pump, S [$m^2$] denotes a cross-sectional area corresponding to the height H of the pressure chamber, and N denotes the number of the ejection ports.

5. The liquid ejection head according to claim 1, further satisfying the following formula.

$$H^{-0.34} \times P^{-0.66} \times W > 1.7$$

6. The liquid ejection head according to claim 1, further comprising a first pressure regulation unit configured to regulate a pressure of the liquid in the supply channel.

7. The liquid ejection head according to claim 6, wherein the first pressure regulation unit includes a first valve chamber, a first pressure control chamber, a first opening that allows the first valve chamber and the first pressure control chamber to communicate with each other, and a first valve configured to be able to open and close the first opening.

8. The liquid ejection head according to claim 7, wherein the first pressure control chamber includes a first pressing plate that has a surface partially formed of a first flexible member configured to be displaceable and is displaceable in conjunction with the first flexible member, includes a first urging member that urges the first pressing plate in a direction in which the first pressure control chamber has an increased volume, and is configured to be able to open and close the first valve in accordance with displacement of the first pressing plate and the first flexible member.

9. The liquid ejection head according to claim 8, further comprising a channel configured to supply liquid from the outside to the first pressure regulation unit.

10. The liquid ejection head according to claim 6, further comprising a second pressure regulation unit configured to regulate the pressure of the liquid in the collecting channel.

11. The liquid ejection head according to claim 1, comprising a bypass that allows the supply channel and the collecting channel to communicate with each other without passing through the pressure chamber.

12. The liquid ejection head according to claim 1, wherein the pump is a piezoelectric pump.

13. The liquid ejection head according to claim 1, wherein the liquid is ink.

14. The liquid ejection head according to claim 13, wherein the ink is a white ink containing titanium oxide.

15. A liquid ejection apparatus comprising a liquid ejection head comprising:

an ejection port portion with an ejection port configured to eject liquid in an ejection direction at a first end portion;

a pressure chamber that includes therein an energy-generating element configured to generate energy required to eject the liquid from the ejection port and communicates with the ejection port portion at a second end portion opposite the first end portion;

a supply channel configured to supply the liquid to the pressure chamber;

a collecting channel configured to collect the liquid from the pressure chamber; and a pump configured to cause the liquid in the collecting channel to flow into the supply channel, wherein $F_{ratio}$ represented by the following formula is 1.4 or less:

$$F_{ratio} = 1.619 \times \left(H^{-0.34} P^{-0.66} W\right)^{-0.1569} \times \log\left(U_x/U_v\right)^{-0.2560}$$

wherein W [μm] denotes a length of the ejection port in a flow direction of the liquid in the pressure chamber, P [μm] denotes a length of the ejection port portion in an ejection direction of the liquid from the ejection port, H [μm] denotes a height of the pressure chamber on an upstream side in the flow direction of the liquid in the pressure chamber, $U_v$ [m/s] denotes an evaporation speed in the ejection port, and $U_x$ [m/s] denotes a flow velocity of the liquid flowing through the pressure chamber.

* * * * *